(12) United States Patent
Kilsdonk

(10) Patent No.: US 10,642,766 B1
(45) Date of Patent: May 5, 2020

(54) FACILITATING SEQUENTIAL DATA TRANSFORMATIONS VIA DIRECT MEMORY ACCESS

(71) Applicant: Daniel Kilsdonk, Westford, MA (US)

(72) Inventor: Daniel Kilsdonk, Westford, MA (US)

(*) Notice: Subject to any disclaimer, the term of this patent is extended or adjusted under 35 U.S.C. 154(b) by 0 days.

(21) Appl. No.: 16/574,643

(22) Filed: Sep. 18, 2019

Related U.S. Application Data

(60) Provisional application No. 62/874,393, filed on Jul. 15, 2019.

(51) Int. Cl.
*G06F 13/28* (2006.01)
*G06F 9/30* (2018.01)

(52) U.S. Cl.
CPC ............ *G06F 13/28* (2013.01); *G06F 9/3001* (2013.01); *G06F 9/30112* (2013.01)

(58) Field of Classification Search
CPC ..... G06F 9/3001; G06F 9/30112; G06F 13/28
See application file for complete search history.

(56) References Cited

U.S. PATENT DOCUMENTS

| | | |
|---|---|---|
| 4,189,769 A | 2/1980 | Cook et al. |
| 4,471,427 A | 9/1984 | Harris |
| 4,481,578 A | 11/1984 | Hughes et al. |
| 4,878,166 A | 10/1989 | Johnson et al. |
| 6,453,365 B1 | 9/2002 | Habot |
| 6,721,806 B2 | 4/2004 | Boyd et al. |
| 2002/0026543 A1* | 2/2002 | Tojima ............... G06F 13/30 710/22 |
| 2005/0188120 A1* | 8/2005 | Hayden ............... G06F 13/34 710/22 |
| 2005/0216608 A1* | 9/2005 | Wang ............... G06F 13/28 710/22 |
| 2007/0073922 A1* | 3/2007 | Go ............... G06F 13/28 710/22 |
| 2009/0216964 A1* | 8/2009 | Palladino ............... G06F 13/28 711/154 |
| 2014/0215103 A1* | 7/2014 | Cohen ............... G06F 13/28 710/23 |
| 2014/0281629 A1* | 9/2014 | Bose ............... G06F 1/3228 713/323 |
| 2017/0024270 A1* | 1/2017 | Loeliger ............ G06F 11/0772 |

* cited by examiner

*Primary Examiner* — Eric T Oberly
(74) *Attorney, Agent, or Firm* — Hamilton, Brook, Smith & Reynolds, P.C.

(57) ABSTRACT

A direct memory access (DMA) device provides for transforming source data as it is transferred to a destination memory space. The transformation can encompass a range of arithmetic logic unit (ALU) operations. The transformation can include discerning comparative matches in the source address space, such that matched-indice-reference-offsets are transferred to destination memory. A processor requesting the transfer can also configure the transformation to be completed by writing configuration data to memory and/or programming the DMA device. In transforming data as it is transferred, the DMA device can obviate time-consuming processing otherwise done after conventional DMA transfers.

21 Claims, 20 Drawing Sheets

LOAD KEY/TRANSFORM CIRCUIT

ADDITIONAL REGISTERS AND COUNTERS

ISOLATE TERMINAL COUNT AND SOURCE COUNTER

FACILITATING SEQUENTIAL DATA TRANSFORMATIONS VIA DIRECT MEMORY ACCESS

RELATED APPLICATION

This application claims the benefit of U.S. Provisional Application No. 62/874,393, filed on Jul. 15, 2019. The entire teachings of the above application are incorporated herein by reference.

BACKGROUND

Direct Memory Access (DMA) devices are employed in many digital processor hardware applications to transfer the contents of a source memory device address space to a destination memory device address space, often to prepare for a search or simple transform in the destination memory device address space.

SUMMARY

A traditional DMA device is characterized by its ability to transfer a given number of datums (COUNT), from a given a source address (SRCMEM) to a given destination address (DSTMEM). In many applications, the memory contents could have been searched or transformed during the memory transfer at far less overall computing expense.

In example embodiments presented herein, as the data is transferred, it may be transformed by virtue of a specified TRANSFORM CONFIGURATION, which includes a function:FUNC, and an arithmetic/logic Operand:OPERAND2 or search KEY, which is further specified as being defined by the number-of-bits (KEYNUMBITS) which defines the size of OPERAND2. The TRANSFORM CONFIGURATION can also specify whether the particular COUNT of datums to be transferred pertains to an initial transfer or a continuing transfer, in which case, the state of the preceding transfer is maintained. Finally, the TRANSFORM CONFIGURATION can also specify whether the calculation is for each datum in the SRCMEM address space or if the calculation is to be a "composite" of all of the datums in the SRCMEM address space such as pursuant to an overall file signature.

While a traditional DMA performs simple arithmetic logic unit (ALU) operations for incrementing the address count, an ALU in example embodiments may be configured to accommodate a range of different transformations, including transformations generally offered by widely-used ALUs.

The TRANSFORM CONFIGURATION may be pre-set in the memory in the traditional DMA's "destination address space" which is pre-configured before the DMA TRANSFORM transfer is specified/enabled by the CPU.

Alternatively, the TRANSFORM CONFIGURATION may be configured in the same way that a DMAs Source Address, Destination Address, and Count are configured as commonly done in DMA transfer methods.

Normal DMA operation is then invoked except that the source address space SRCMEM/COUNT is transformed by the specified Transform (FUNC) in conjunction with OPERAND2. The Transform accommodates the set of ALU-provided functions. Additionally, it can facilitate the sifting (searching) of the source memory block for matches with the OPERAND2 (KEY) and reporting the offsets (indices) instead of the actual values.

Once a Transform Mode is operational, the transformed source space is transferred to the destination space. In the example of the "search" transform (ALU FUNC=CMP: Compare), when a key (OPERAND2) is identified in the transfer stream: the datum counter, instead of the datum, is transferred to destination memory space. This overwrites DSTMEM which may contain the original key descriptions and the destination datum counter is incremented. In this way, depending solely on the FUNC proscribed, the result of the DMA-with-Transform is that the destination block is either a mathematically/logically transformed source block or a list of offsets (indices) wherein OPERAND2 can be found in the source memory.

Example embodiments include a DMA device comprising a circuit and a sequencer. The circuit may be configurable to perform operations as a function of configuration information, and may include a buffer. The sequencer may be configurable to 1) cause the buffer to read the configuration information from a destination memory address space to configure the circuit to perform a given operation; 2) cause the buffer to read source data from a source address space, the circuit configured to perform the given operation on the source data; and 3) cause the buffer to write results of the given operation to the destination memory address space.

The circuit may further include an operation operand register that is initialized with an operand from the configuration information. The operation operand register size may be specified by a number of bits from the configuration information. A hysteresis buffer may have a dimension of equal length as the operation operand register. A shift register may enable the circuit to perform the given operation on the source data as a function of the operand. A comparator may be configured to confirm a write to destination memory.

The circuit may further include an operand number-of-bits register and a mask register with a dimension of equal length as the operation operand register. Further, an operation function register may be initialized with a function specific to an arithmetic logic unit (ALU) implemented within the device. The operation function register may be initialized to indicate whether a search operation includes a compare operation to be performed by the ALU. A continuation register may be initialized to specify whether a transfer is to retain state information from a previous transfer or transform operation. A composite register may be initialized to specify whether a transform is to be a composite transform operation or a one-for-one transform operation.

Further embodiments may include a computer system comprising a CPU and a direct memory access (DMA) device. The CPU may be configured to write DMA configuration data into destination memory address space or to write the DMA configuration data directly to the device and to cause the DMA device to change operating modes from a first mode to a second mode. The second mode may cause the DMA device to read the DMA configuration data from the destination memory address space to configure the DMA device to transform source data from source memory address space and write transformed data to the destination memory address space. The CPU may be further configured to read the transformed data from the destination memory address space. In the first mode, the DMA device may be configured to transfer the source data to the destination memory.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
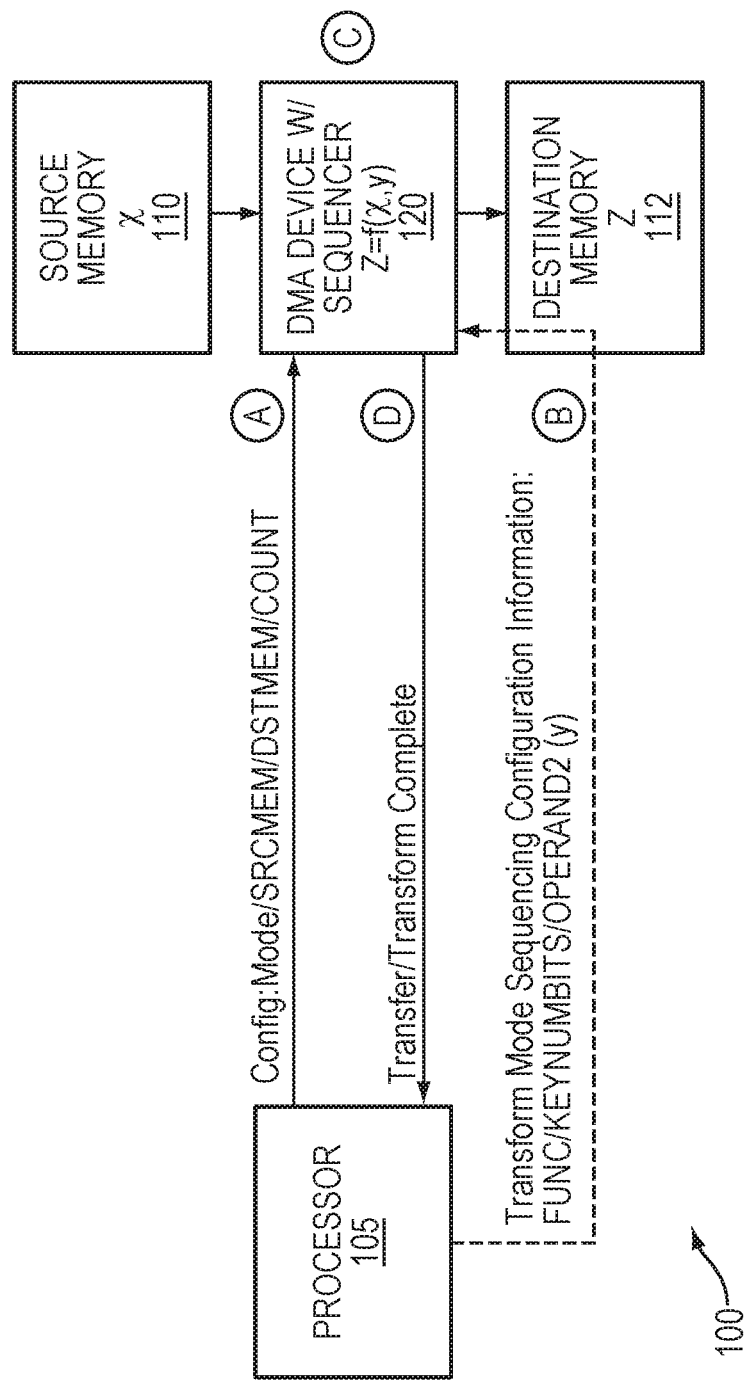
FIG. 1 is a block diagram of a system in an example embodiment.

A description of example embodiments follows.

Example 1, below, provides an example of an encoded approach to Memory Access of a Page or Block of Data without DMA:

```
0000000A-:start     MOVE DX, #0                ;register DX=0 Counter!
0000000C-:loop      CMP DX, #COUNT             ;contents of register DX=value COUNT?
0000000D-           JEQ :outofloop             ;if so, jump to address
0000000E-           MOVE BX, $DSTMEMADDRESS    ;register BX=DSTMEM Address
0000000E-           MOVE CX, $SOURCEADDRESS
0000001A-           ADD BX, DX                 ;DSTMEM address+count
0000001B-           ADD CX, DX                 ;soure address+count
0000001C-           MOVE [CX], AX              ;move the contents at source+count in
0000001F-           MOVE AX, [BX]              ;save it in memory @ DSTMEM+count
0000002B-           INC DX                     ;increment counter
0000002C-           JMP :loop                  ;jump back to the count test
0000002D-:outofloop
```

The promise of DMA was to make code such as this unnecessary.

Using DMA, we are normally spared the time otherwise used for memory fetches for these machine instructions, their necessary decoding, their argument fetches, their arithmetic, and their memory stores of intermediate results. In fact, the Processor can execute within Cache and is therefore free to do other tasks while the memory bus is used by the DMA device. The order of complexity of the machine code approach is ~O(40n)+5 while that of the DMA transfer is ~O(4n)+2.

Once the data block is transferred, the programmer can now manipulate the data.

In so many cases, the programmer's first process involves stepping through the data of the data block and altering the data. One example is to do an encryption of the data by XORing each datum with the binary 11011100 (an example "cipher" key). In this example, the data was that read in by DMA transfer or the code in Example 1.

Example 2, below, typifies a programmer's next step after the DMA operation, in this case enciphering the data:

```
0000000A-:start     MOVE DX, #0                ;register DX=0 Counter!
0000000C-:loop      CMP DX, #COUNT             ;contents of register DX=value COUNT?
0000000D-           JEQ :outofloop             ;if so, jump to address
0000000E-           MOVE BX, $DSTMEMADDRESS    ;register BX=DSTMEM Address
0000000E-           MOVE CX, $SOURCEADDRESS
0000001A-           ADD BX, DX                 ;DSTMEM address+count
0000001B-           ADD CX, DX                 ;soure address+count
0000001C-           MOVE [CX], AX              ;move the contents at source+count in
0000001D-           XOR AX, #b01101110         ;"ENCRYPT" the datum
0000001F-           MOVE AX, [BX]              ;save it in memory @ DSTMEM+count
```

| | | |
|---|---|---|
| 0000002B- | INC DX | ;increment counter |
| 0000002C- | JMP :loop | ;jump back to the count test |
| 0000002D-:outofloop | | |

Here, SOURCEADDRESS is the DSTMEMADDRESS of Example 1 and DSTMEMADDRESS is yet-another-buffer.

Notice how similar the programmer's "encrypting" is to the original problem DMA solved wherein machine code was avoided in favor of a dedicated memory transfer device. One can see that the block may be perused exactly the same except for the noteworthy data transformation (XOR) that provides encryption.

In this, the programmer has had a block of data transferred in via DMA, only to have to re-develop much the same algorithm. The difference between this and a memory-to-memory transfer involves the placement of one XOR instruction in the otherwise memory-to-memory DMA transfer. The XOR step, like most ALU operations is combinatorial and can be done with insignificant delay.

Example 3, below, exemplifies another prolific "next-step" for the programmer: searching the data for datums that compare with a search key (e.g., 01101110):

memoryCopyTransform(DSTMEM,'filedownload.exe', filesize,'XOR','b0000000000000000')
if DSTMEM[0]!=CorrectChecksum print 'SECURITY ALERT:altered file'
else memoryCopy(DSTMEM,'filedownload.exe',filesize)

Here, the KEYMASK is inferred from the size of the argument given, that is /16 bits.

The legacy DMA transfer requires a specification of the begin Source Memory Address (SRCMEM), the begin Destination Memory Address (DSTMEM), and a count of the number of datums to be transferred (COUNT).

FIG. 1 is a block diagram of a system 100 in which example embodiments may be implemented. The system 100 includes a processor 105 (e.g., a CPU), a DMA device 120, a source memory 110, and a destination memory 112. In a first mode of operation, the processor 105 may communicate with the DMA device 120 to effectuate a transfer of data from the source memory 110 to the destination memory 112. The processor 105 may be configured to write

| | | |
|---|---|---|
| 0000000A-:start | MOVE DX, #0 | ;register DX=0 Counter! |
| 0000000B- | MOVE EX, #0 | |
| 0000000C-:loop | CMP DX, #COUNT | ;contents of register DX=value COUNT? |
| 0000000D- | JEQ :outofloop | ;if so, jump to address |
| 0000000E- | MOVE BX, $DSTMEMADDRESS | ;register BX=DSTMEM Address |
| 0000000E- | MOVE CX, $SOURCEADDRESS | |
| 0000001A- | ADD BX, EX | ;DSTMEM address+count |
| 0000001B- | ADD CX, DX | ;soure address+count |
| 0000001C- | MOVE [CX], AX | ;move the contents at source+count in |
| 0000001D- | CMP AX, #b01101110 | ;search compare |
| 0000001E- | JNEQ :skip | |
| 0000001F- | MOVE AX, [DX] | ;save it in memory @ DSTMEM+count |
| 0000002A- | INC EX | |
| 0000002B-:skip | INC DX | ;increment counter |
| 0000002C- | JMP :loop | ;jump back to the count test |
| 0000002A-:outofloop | | |

Even in the prolific case where operative values are sought, the programmer's method mimics that of the original DMA.

In example embodiments, there may be a set of transforms that can be done during the DMA which can provide initial processing of interest to programmers. For example, if a shift operation were warranted, it would have no delay associated with it since a shift is a 'wired' operation. Combinatorial functions associated with the CPU's ALU can be also be accommodated.

It is noteworthy that the programmer's final step is, many times, writing the manipulated data back to memory which allows another opportunity for transformation.

The processing of Example 1 is so prolific in fact that a "memoryCopy(DSTMEM,SRCMEM,COUNT)" library call available in many programming languages translates the programmer's desire to copy memory into an operating system call to perform the more efficient DMA transfer.

Example embodiments may provide a new programming facility: "memoryCopyTransform(DSTMEM,SRCMEM, COUNT,FUNC,OPERAND2)"

Example 4, below, simplifies the case wherein a file is fetched but its use is warranted only if its checksum is verified:

DMA configuration data into destination memory address space 112 and to cause the DMA device 120 to change operating modes from a first mode to a second mode. The second mode may cause the DMA device 120 to read the DMA configuration data from the destination memory address space 112 to configure the DMA device to transform source data from source memory address space 110 and write transformed data to the destination memory address space 112. The processor 105 may then read the transformed data from the destination memory address space 112. The DMA configuration data may be written to otherwise unused memory space at the destination memory 112, thereby enabling the facilities for a transform operation to be isolated and evolved separately while minimizing changes to the DMA interface over a legacy DMA interface.

Figure 2:
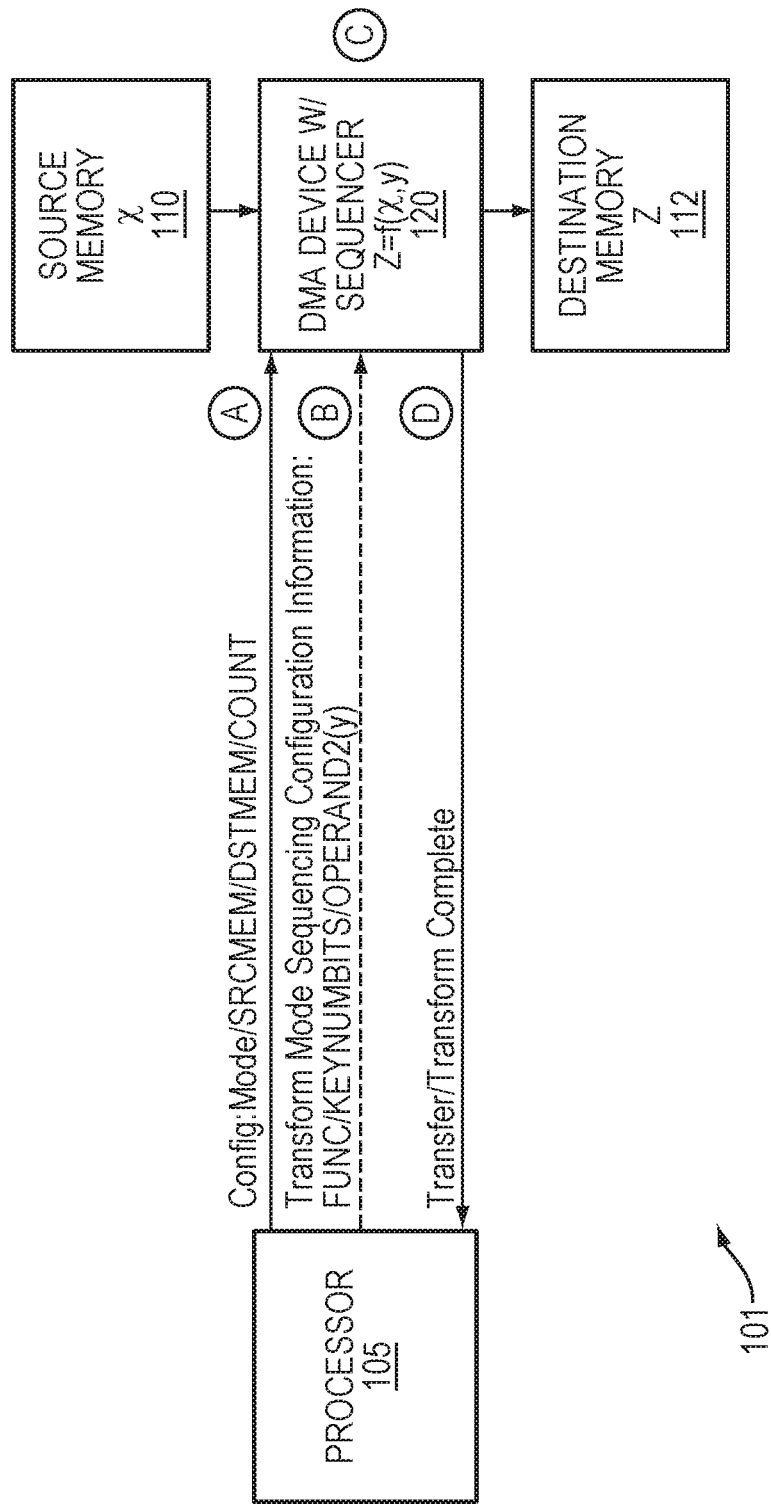
FIG. 2 is a block diagram of a system in a further embodiment.

FIG. 2 depicts a system 101 that is comparable to the system 100 described above, including the processor 105, DMA device 120, source memory 110 and destination memory 112. The system 101 may be configured differently from the system 100 in that the processor 105 communicates directly with the DMA device 120 to convey the DMA configuration data, rather than writing it to the destination memory 112. The system 101 thus demonstrates an approach to configuring the DMA device 120 for a transform mode that may be an expansion of an approach used by DMA devices to configure the source memory 110 (SRCMEM), destination memory (DSTMEM), and the count of the number of datums to be transferred COUNT. Thus, the systems 100, 101 of FIGS. 1 and 2 represent two approaches to facilitating the configuration of a DMA Transform mode, which configures the function and operand that is applied to each datum in source memory in example embodiments.

With reference to FIGS. 1 and 2, an example DMA Transform process may begin as the processor 105 writes configuration information to the DMA device 120 and selects the operative mode of the DMA device 120(A). The operative mode may indicate at least one of 1) a transfer of data from the source memory 110 to the destination memory 112 without transformation of the data (e.g., the first mode described above), and 2) a transfer with transformation of the data (e.g., the second mode described above). If the operative mode of the DMA device 120 is the transform mode, then additional configuration information may be written to the destination memory 112 (FIG. 1) and/or the DMA device 120 (FIG. 2) to facilitate the transform (B).

The systems 100, 101, in performing a DMA transform mode, may utilize configuration information including a mode distinction (TRANSFORM), the ALU FUNC to be performed, the second argument for the FUNC (OPERAND2), a bit-size of the OPERAND2 (KEYMASK), a distinction as to whether all datums should be compiled into one result (COMPOSITE) or not, and a distinction as to whether the previous state of the TRANSFORM is to be retained (CONTINUE).

Once the parameters have been established in the DMA device 120, it may request that the processor 105 withhold all use of the address and data buses and await an acknowledgement to this effect before starting the datum-by-datum transfer/transform of the data at the source memory 110 into the destination memory 112 (C). When the DMA device's 120 count of all source memory addresses has been processed, the DMA device 120 may signal transfer completion, and the signal may be latched into a programmable interrupt controller (not shown), thus apprising the processor 105, which may respond by adopting the appropriate interrupt handler (D).

Figure 3:
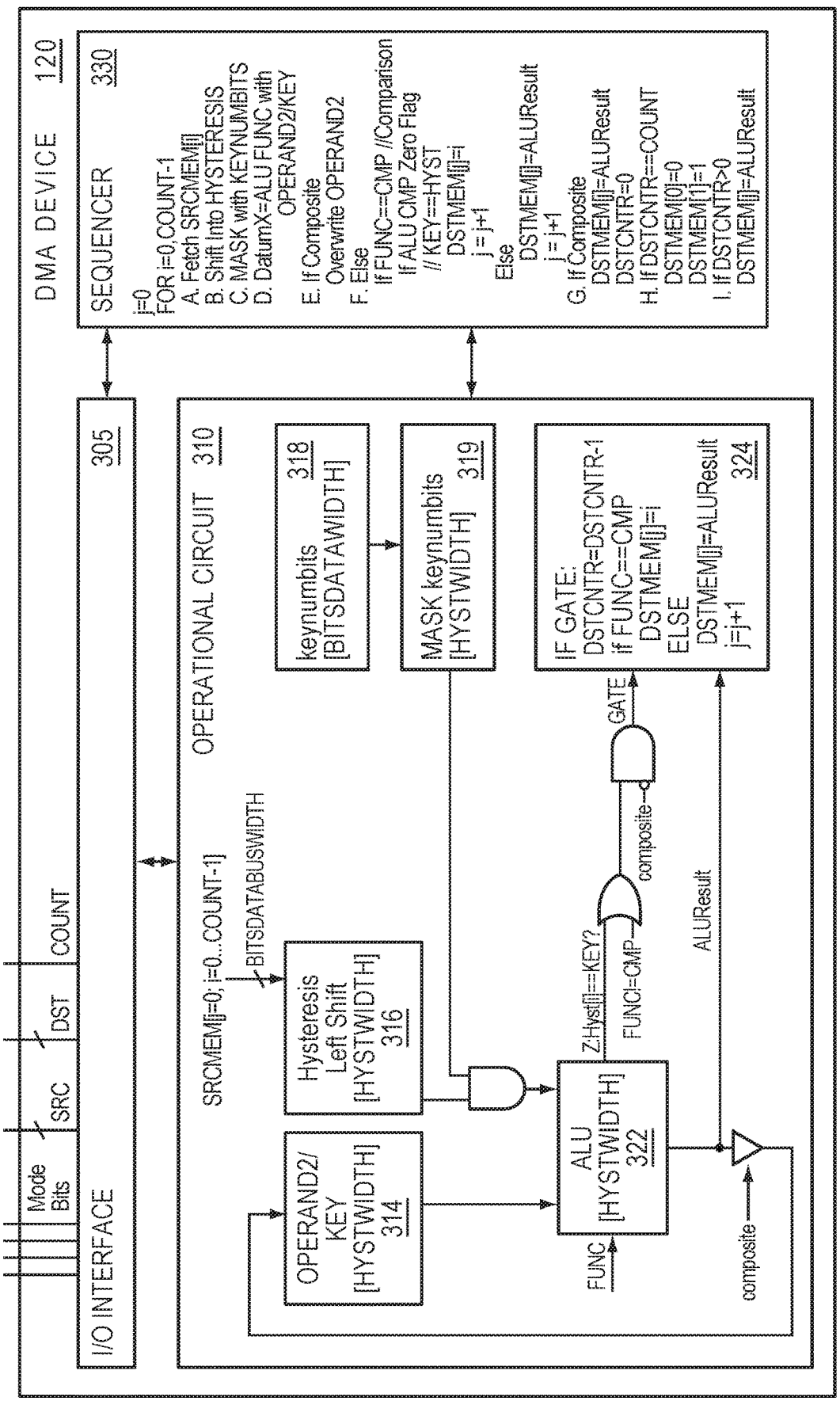
FIG. 3 is a block diagram of a direct memory access (DMA) device in an example embodiment.

FIG. 3 illustrates the DMA device 120 in further detail. The DMA device 120 may include an I/O interface 305, an operational circuit 310, and a sequencer 330. The operational circuit 310 may be configurable to perform operations as a function of the configuration data, and may include a buffer (e.g., one or more registers 314, 316, 318, 319) to retain these configuration settings or settings synthesized from this information as described in further detail below. With reference to FIGS. 1 and 3, the sequencer 330 may be configurable to 1) cause the buffer to read the configuration information from a destination memory address space 112 to configure the circuit 310 to perform a given operation; 2) cause the buffer to read source data from the source address space 110, the circuit 310 performing the given operation on the source data; and 3) cause the buffer to write results of the given operation to the destination memory address space 112.

The circuit may further include an operand number-of-bits register 318 (KEYNUMBITS) and a mask register 319 with a utility dimension so specified by register 318.

The circuit may further include an operation operand register 314 that is initialized with an operand (OPERAND2) from the configuration data. (OPERAND1 would be the data supplied from SRCMEM.) The operation operand register utility size (HYSTWIDTH) may be limited by implementation restrictions. Its operational utility size may be specified by an OPERAND2/KEY number-of-bits specification (KEYNUMBITS) provided in the configuration data supplied during initialization.

A hysteresis buffer 316, a DATABUSWIDTH parallel loadable shift register, may have a dimension of equal length as the operation operand register 314. This shift register 316 can provide the circuit 310 with source data that, in conjunction with the operand (OPERAND2), has the information to perform a given operation (FUNC) on the two operands to produce a logical, mathematical or search result. A comparator may be configured to confirm the writing of the result to destination memory.

Further, an operation function register may be initialized with a function specific to an arithmetic logic unit (ALU) 322 implemented with the device. The operation function register (FUNC) may be initialized to indicate whether a search operation includes a compare operation to be performed by the ALU. A continuation register may be initialized to specify whether a transfer is to retain state information from a previous transfer or transform operation. A composite register may be initialized to specify whether a transform is to be a composite transform operation or a one-for-one transform operation.

A hysteresis shift register contains a shifting memory of recently surveyed source data, which is produced for each datum fetched from the source memory 110 as the DMA device 120 scrolls through the source memory datum-by-datum. In some cases, this may be the datum fetched, with larger keys, it concatenates the datums fetched.

The KEY/OPERAND2 register 314 holds the search KEY for in the case of a Comparison operation and holds OPERAND2 if a logical/arithmetic transform is desired. The KEYNUMBITS register determines how many bits are MASKED as to the relevancy of leading zeroes in the bit expression of the OPERAND2 specification or for forming 16-bit words from 8-bit fetches for 16-bit machines operating on a byte-wide data bus for example. It can also be the case that, for example, a 10-bit search key is sought in a byte-by-byte data stream.

Where a composite result is sought, the KEY/OPERAND2 register can be used to retain the compiled intermediate result.

Write logic 324 may prevent a write to destination memory if the result is an intermediate step towards a composite result, or for a Comparison (CMP), if the source memory datum surveyed is not a match with the search key. If the result is not prevented, the indice is written for the comparison case. For the non-composite, non-comparison case, the result of the calculation is written and the destination write indice is incremented to prepare for the next write occurrence.

Figure 4A:
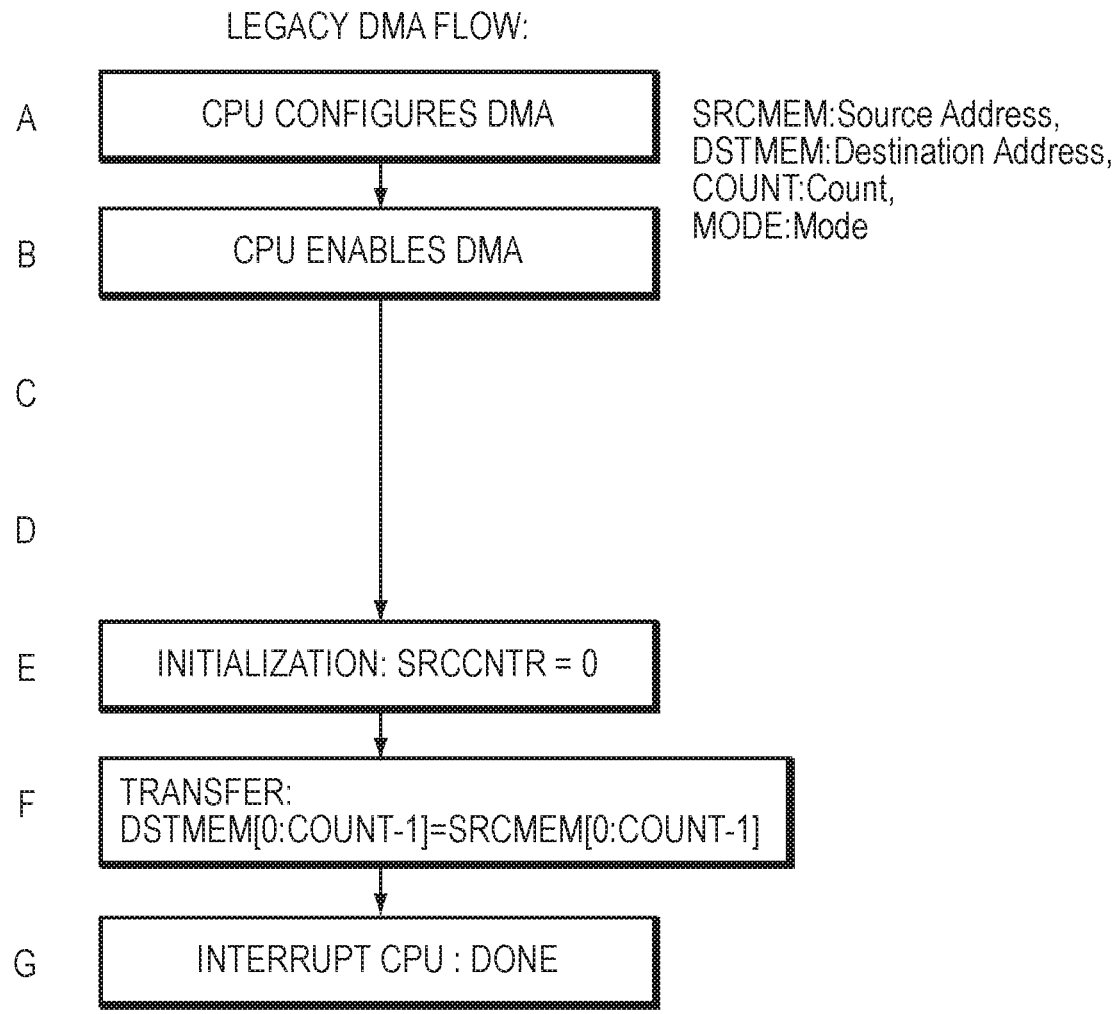
FIG. 4A is a flow diagram illustrating operation of a conventional DMA device.
Figure 4B:
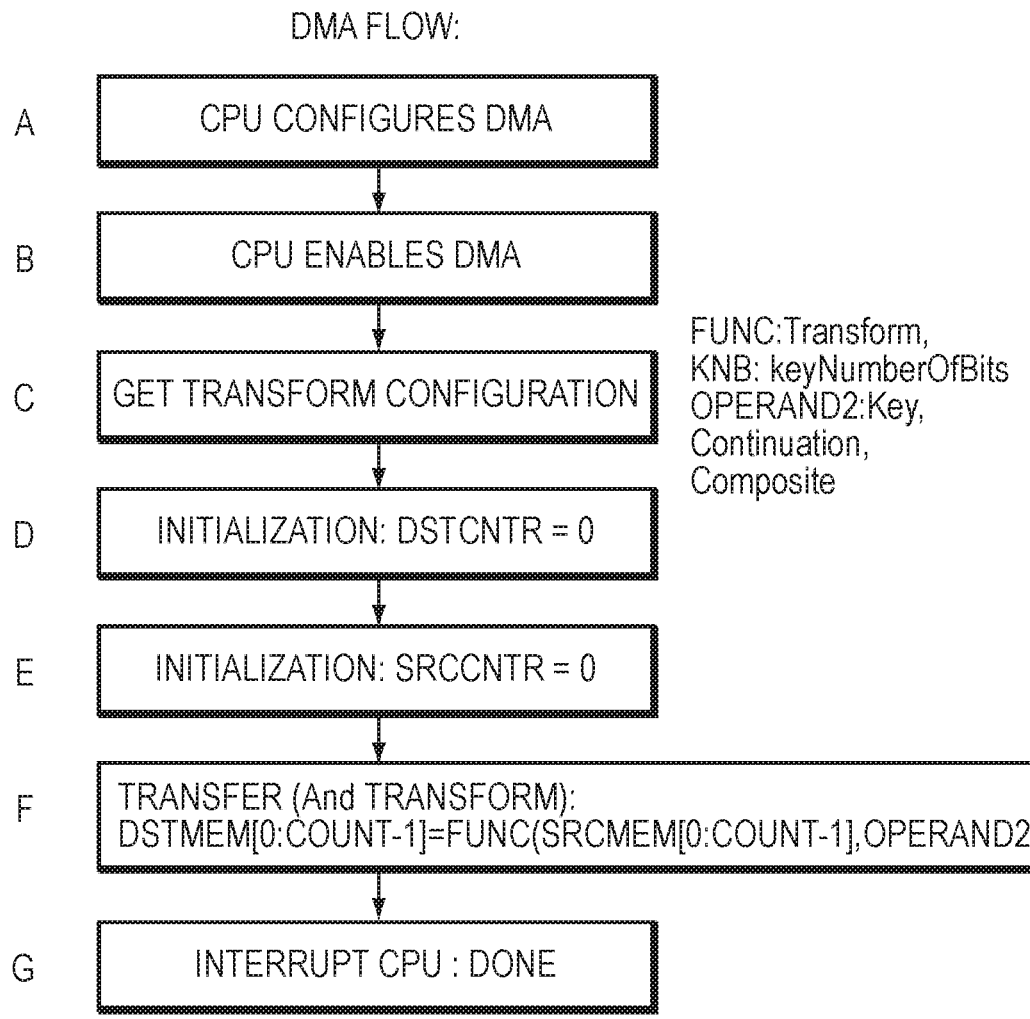
FIG. 4B is a flow diagram illustrating operation of a DMA device in an example embodiment.

FIGS. 4A-B are flow charts illustrating an operation by a DMA device such as the DMA device 120 described above. FIG. 4A illustrates operation of a DMA device during a transfer operation, which may also be carried out by legacy (conventional) DMA device. FIG. 4B illustrates a transform-mode operation that may be carried out by the DMA device 120 in an example embodiment. Comparing FIGS. 4A and 4B illustrates how a legacy DMA device can be augmented to facilitate transforms as part of its transfer functionality.

Referring to FIGS. 4A and 4B, operations C, D, and F are notably changed to provide new Transform Mode functionalities. Operation C represents attaining the TRANSFORM specification. In operation D, to facilitate the "search" and "composite" functionality, the DSTCNTR is distinguished from the SRCCNTR because a particular datum or its transform may not be written to DSTMEM. Because the number of datums written to destination space (j) may be less than the number of datums read from source space (i), the two may have separate means of counting. For simple, non-composite, arithmetic/logic operations, the number of datums in both the source and address space will be the same. For "composite" transforms, there may be one and only one result for each block of data. Finally, for search transforms, the resultant destination space may be a list of offsets that include offsets only where key matches are identified.

For facilitating Search mode, the result of the transfer may be limited to offsets wherein datum matches are found. The number of these entries into destination memory may be less than the count of source addresses considered. These list values are in ascending order and if the number of list values is less than the block transfer size, the final entry is demarked by listing it twice. This value is entered twice to 'frame' the end-of-list. An empty list is demarked with an initial non-zero value and a second value being less than the first. If all entries match, the list is full and is monotonically increasing throughout.

Figure 5:
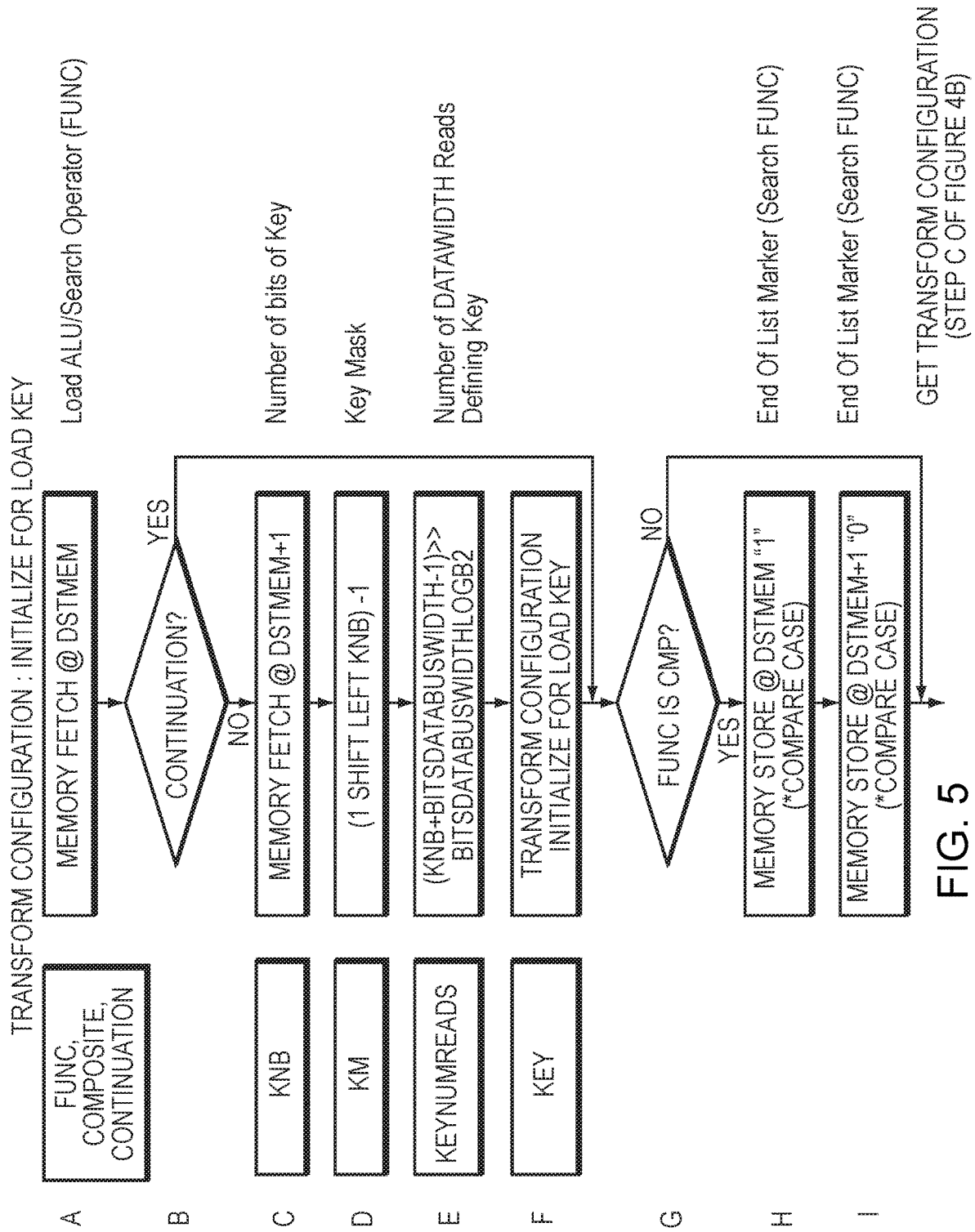
FIG. 5 is a flow diagram of a configuration process in one embodiment.

FIG. 5 details operation C of FIG. 4 ("Get Transform Configuration"). This is related to operation B of FIG. 1. It depicts the initialization of the Transformation Configuration wherein the Transform Operator FUNC, Transform Operand (OPERAND2), and the number of bits containing OPERAND2 are loaded to the DMA local register set.

FUNC is the ALU operation specification (Operation A) which generally requires fewer than BITSDATAWIDTH bits and so one of the most-significant-bits of this datum fetch is devoted to the specification of whether the transfer is a "continuation." This indicates whether the previous transfer's state is to be retained or cleared. Another of the most significant bits indicates whether the transfer is to be a "composite" (one final result) or an entry-by-entry result.

FIG. 5 Operation A fetches the FUNC, Composite, and Continuation settings for the Transform DMA transfer containing BITSDATAWIDTH bits:
 a) By convention, the two highest bits:Continue ("c"), composite("a")
 b) Remaining Bits:differentiate ALU Operation "FUNC".
 c) Continue: This block transfer retains hysteresis from previous block transfer including:
    i. ALU Operation "FUNC",
    ii. Key,Keymask and composite setting
 d) Composite: Result of transfer is ALU FUNC performed with OPERAND2 and all SRCMEM datums, resulting in one entry in DSTMEM
 e) Not Composite: Each datum in SRCMEM has operation performed to produce one transformed datum in DSTMEM
 f) "OPERAND2" will be the second argument of the "FUNC" operator, the first being the datum in the SRCMEM space being transferred/transformed.

If it is not the "continuation" case, an OPERAND2 specification may be obtained. OPERAND2 is obtained from pre-configured DSTMEM. This is achieved by first getting the number-of-bits that define OPERAND2 (Key).

FIG. 5 also depicts the configuration of OPERAND2 (Operation B of FIG. 1). The number of "reads" required to obtain the entire OPERAND2 is based on the number of bits of the Key and the size of the data bus (Operation E). These references are sequentially streamed into a HYSTERESIS shift register until all are referenced (Operation F). The HYSTERESIS register is then transferred to the KEY Register which is OPERAND2 for the Transform operations.

Certain parameters for a given legacy DMA device are well-known and helpful in determining the number of references required for a given operand length knowing the data bus width. For example, BITSDATAWIDTH is the specified data bus width, which has a log base(2): BITSDATAWIDTHLOGB2

TABLE 1

DATA BUS PARAMETERS

| BITSDATAWIDTH | BITSDATAWIDTHLOGB20 |
|---|---|
| 8 | 3 |
| 16 | 4 |
| 32 | 5 |
| 64 | 6 |

The circuit of FIG. 3 may be used to collect OPERAND2 when COUNT=(keynumbits+BITSDATAWIDTH−1) shr BIT SDATAWIDTHLOGB2, and FUNC=ADD zero (NO-OP).

Likewise, a more generalized mask can be introduced which has zeroes where bits in a comparison search are "don't cares."

During OPERAND2 fetch, it is practical to initialize the results in DSTMEM for the search/compare-use-case and initialize it to demark the no-results-found case. This will be overwritten if meaningful matches appear in the data.

If the "FDNC" is "Compare(CMP)", offsets into the page/block of source data are written only if the datum at that offset matches the search key (OPERAND2). There are three types of outcomes:
 a) All Matches: The result will be monotonically increasing offsets throughout.
 b) Some number of matches less than the source page size (COUNT) are found: The last match will be duplicated in the list of matches as entry+1.
 c) No Matches: The second entry will be less than the first.

To get OPERAND2 from pre-configured DSTMEM space, the value may require "KEYNUMREADS" datums. "KEYNUMREADS" is based on the number of bits (KEYNUMBITS) specified and the size of the data bus (BITSDATAWIDTH).

Figure 6:
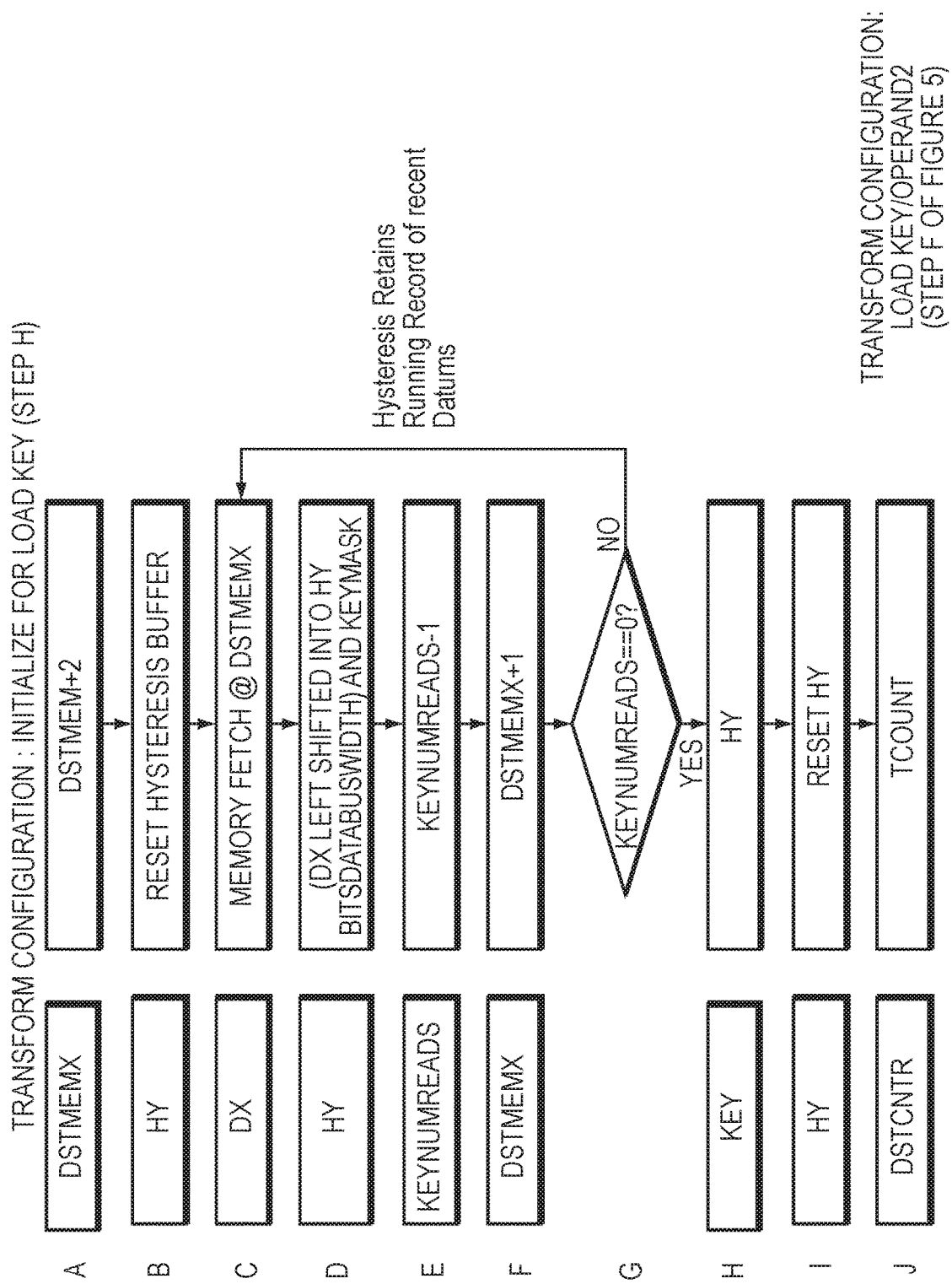
FIG. 6 is a flow diagram of an initialization process in one embodiment.

FIG. 6 depicts the actual scrolling of datums and subsequent reads from DSTMEM space into a shift register entitled "Hysteresis" to attain OPERAND2 (tracked in register "KEY"). This details FIG. 5 operation F.

Figures 7A, 7B:
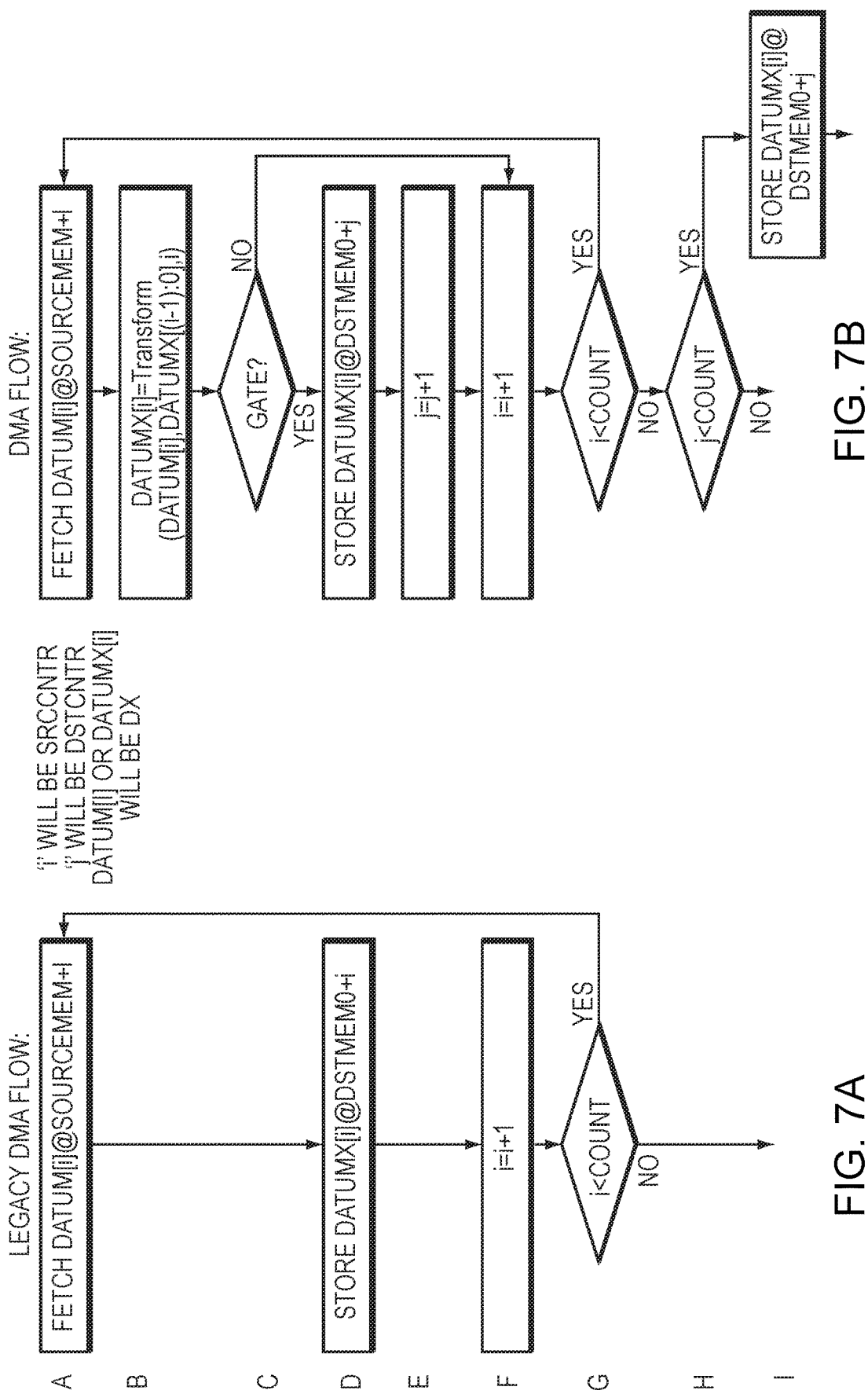
FIG. 7A is a flow diagram of a transfer process by a conventional DMA device.
FIG. 7B is a flow diagram of a transfer and transform process by a DMA device in an example embodiment.

FIGS. 7A-B provide a contrasting overview of a legacy DMA device (FIG. 7A) with that of the DMA device 120 (FIG. 7B) with respect to the actual transfer, the transfer now configured (FIG. 1 or 2: Operation C). The Transformation in Operation "B" creates a transformed datum or a search-key indice that is gated to ensure only matched offsets are recorded or in the "composite" case, that only the final result is written.

Figure 8:
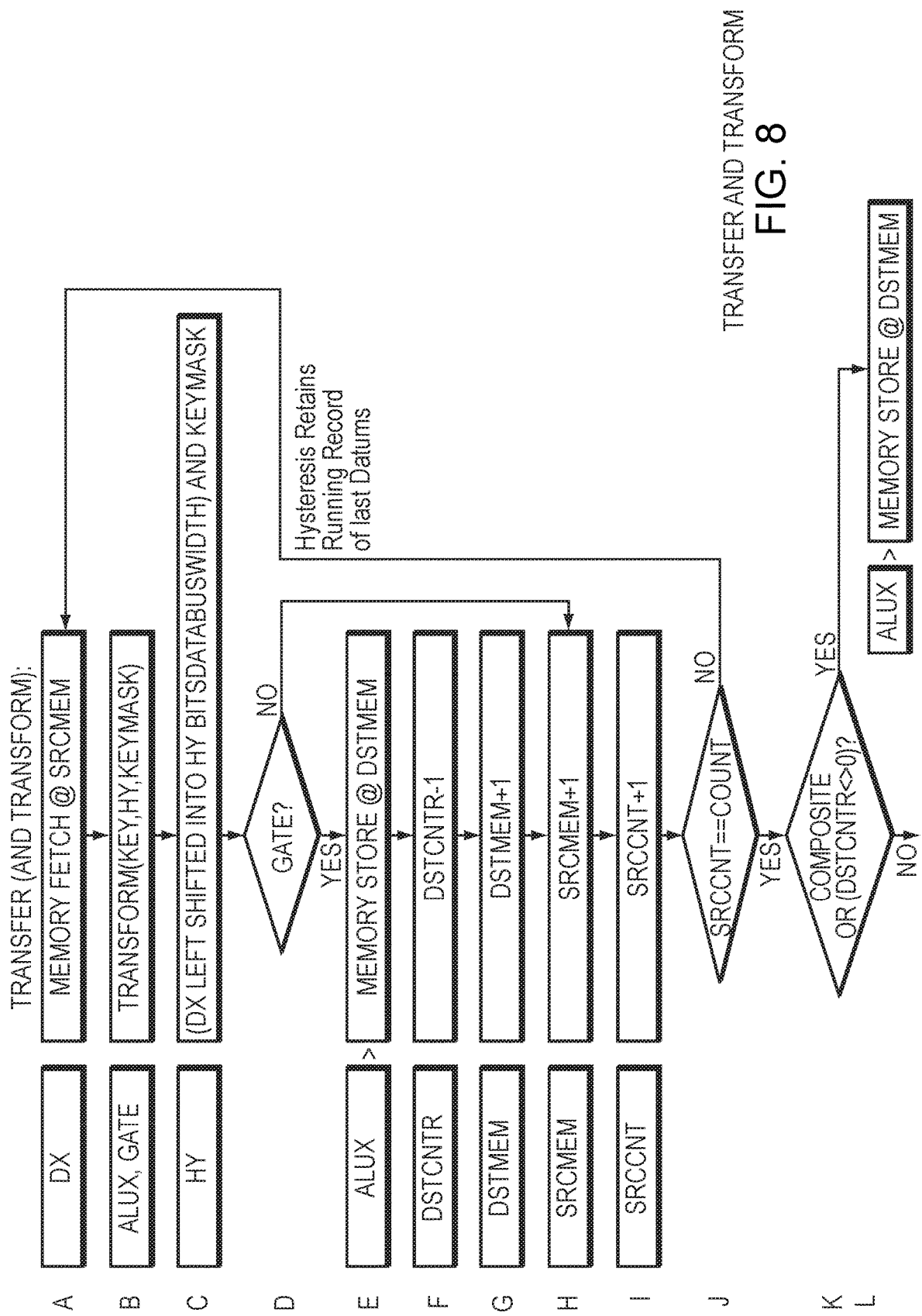
FIG. 8 is a flow diagram of a transfer and transform process in further detail.

FIG. 8 details Operation B of FIG. 7, which is the transformation operation. Operation "L" is to ensure that an end-of-list marker is written for the compare/search use-case wherein a duplicate entry is used to frame the end-of-list, when the number of entries in the list is less than COUNT.

Figure 9:
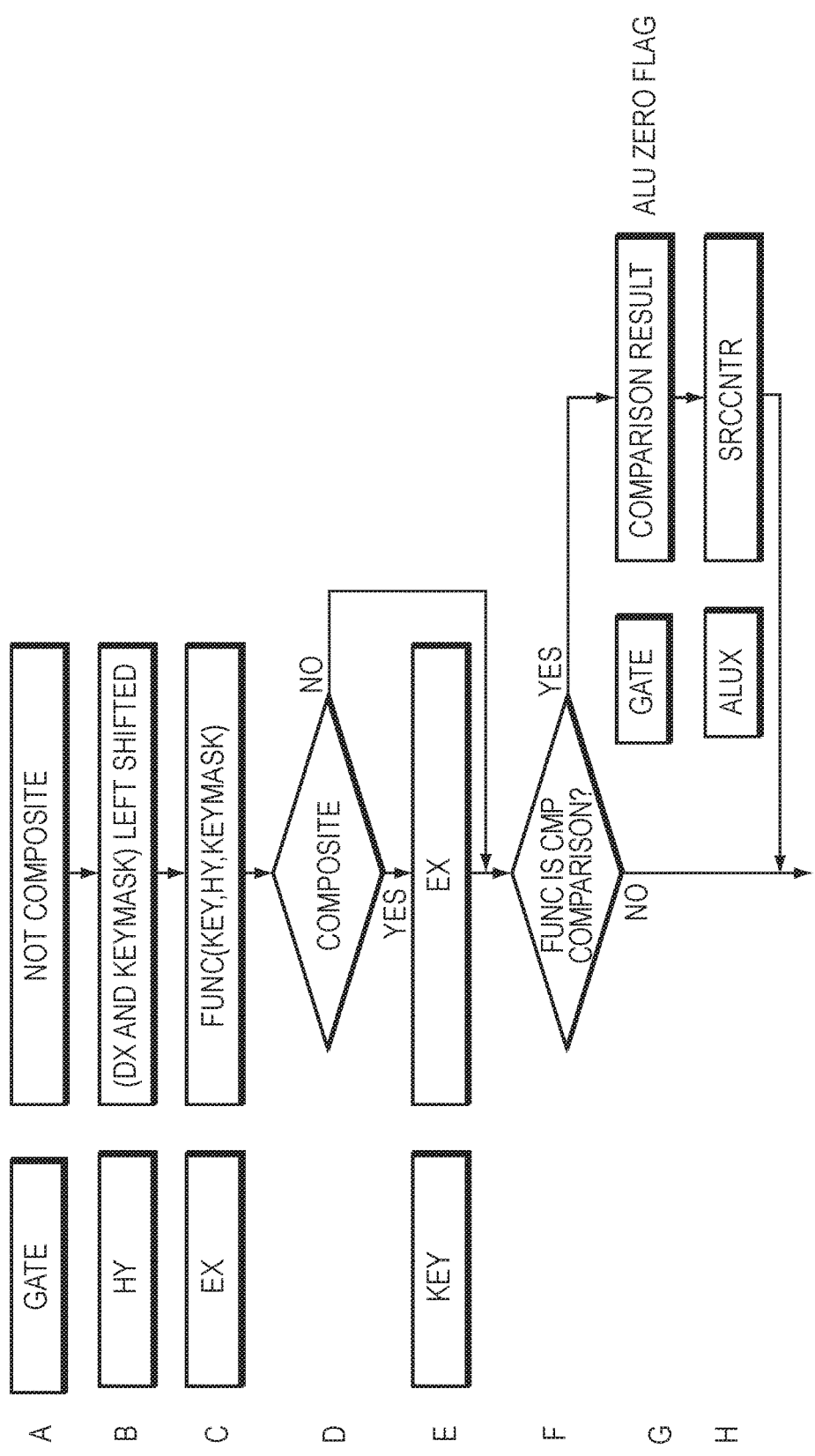
FIG. 9 is a flow diagram of a transfer and transform process in further detail.

FIG. 9 further details the GATE derivation and transform result function of FIG. 8 Operation B. In FIG. 9, GATE enables writing this result to the destination memory 112. GATE is initialized as "not composite" to ensure no writes occur to the destination memory 112 until the composite is attained (all datums have been surveyed). If it is not the composite case, all datums result in a write with each transformed unless the FUNC is "compare" (CMP) in which case the offset is GATED for writing such that a write will occur only if the datum equals the KEY (OPERAND2). In this case, the offset into SRCMEM for which the match occurs will be written as a new entry in DSTMEM.

Operation "F" of FIG. 4B, and operation "C" of FIG. 9 make use of a FUNC, wherein the "FUNC" was attained in operation "A" of FIG. 5. The possibilities are limited by the choice of which ALU is used and what ALU augmentations may be implemented.

Table 2 exemplifies a set of ALU operations available with one popular ALU. Typical ALU functionality might include:

TABLE 2

Example ALU FUNCtions

| FUNC | CODE |
|---|---|
| ADD | 000 |
| OR | 001 |
| ADC | 010 |
| SBB | 011 |
| AND | 100 |
| SUB | 101 |
| XOR | 110 |
| CMP | 111 |

FUNC specifies the Arithmetic Logic Function handling of the math/logic or search functionality to be done transformatively. These FUNC CODES are arbitrary and would be chosen based on the ALU design used.

Regarding FIG. 9, it is noteworthy how the Comparison (CMP) operation affects the gating of writes to destination memory. The initial setting of GATE is overwritten for the CMP case if and only if the ALU indicates that the current SRCMEM contents, presented via the Hysteresis buffer are the same as OPERAND2—the search KEY.

Figure 10A:
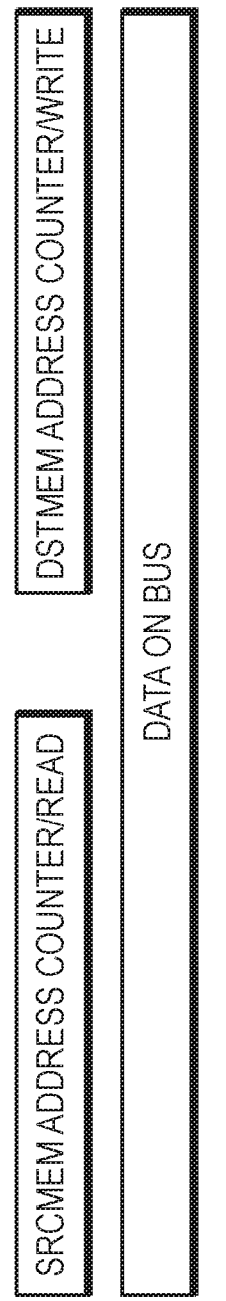
FIG. 10A is a block diagram illustrating conventional bus transfer states.
Figure 10B:
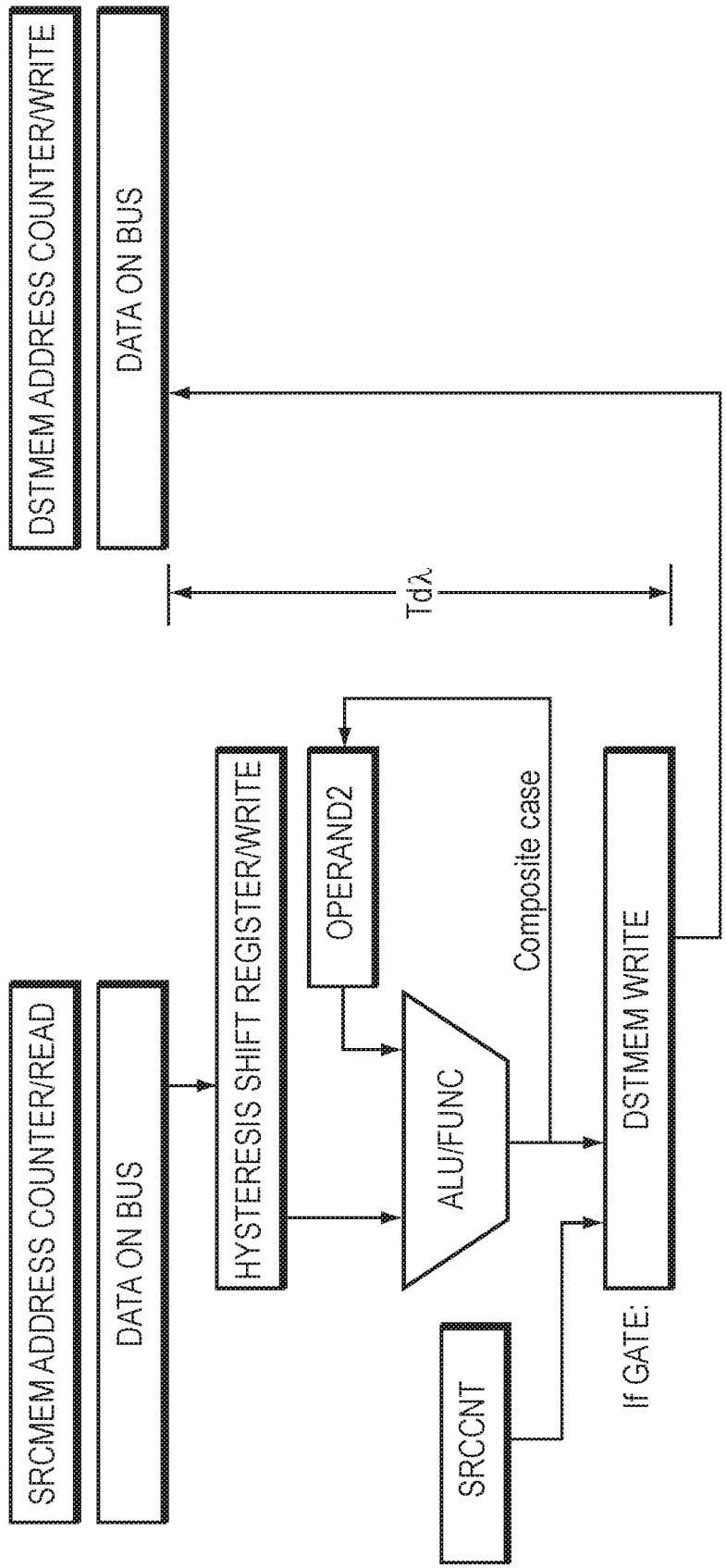
FIG. 10B is a block diagram illustrating bus transfer states in an example embodiment.

FIGS. 10A-B contrasts legacy bus transfer states (FIG. 10A) with those implemented in an example embodiment (FIG. 10B). As shown in FIG. 10B, for the composite case, the working OPERAND2 is updated with interim results.

Figure 11:
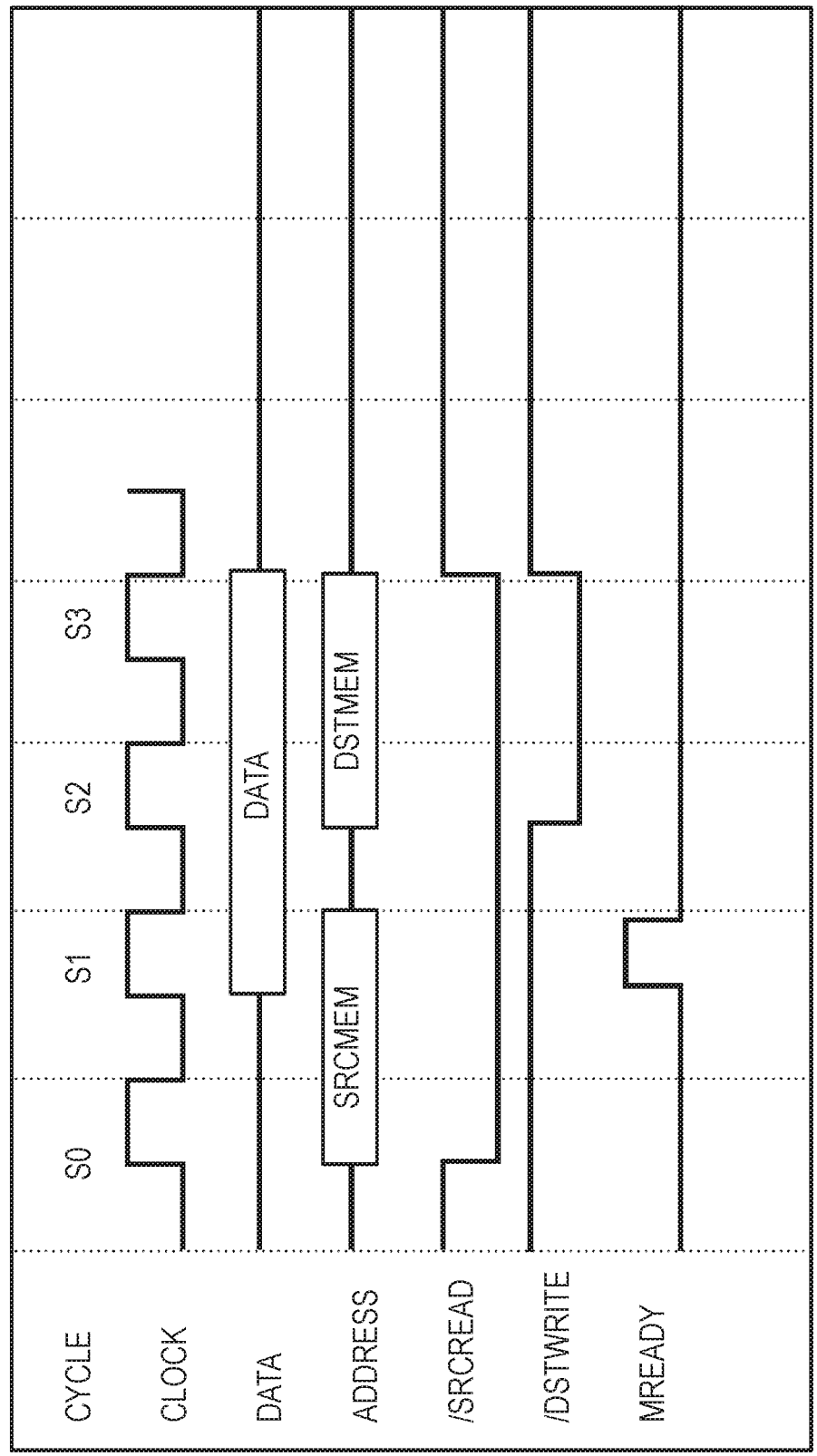
FIG. 11 is a timing diagram of a conventional DMA Memory-Transfer Bus Cycle.
Figure 12:
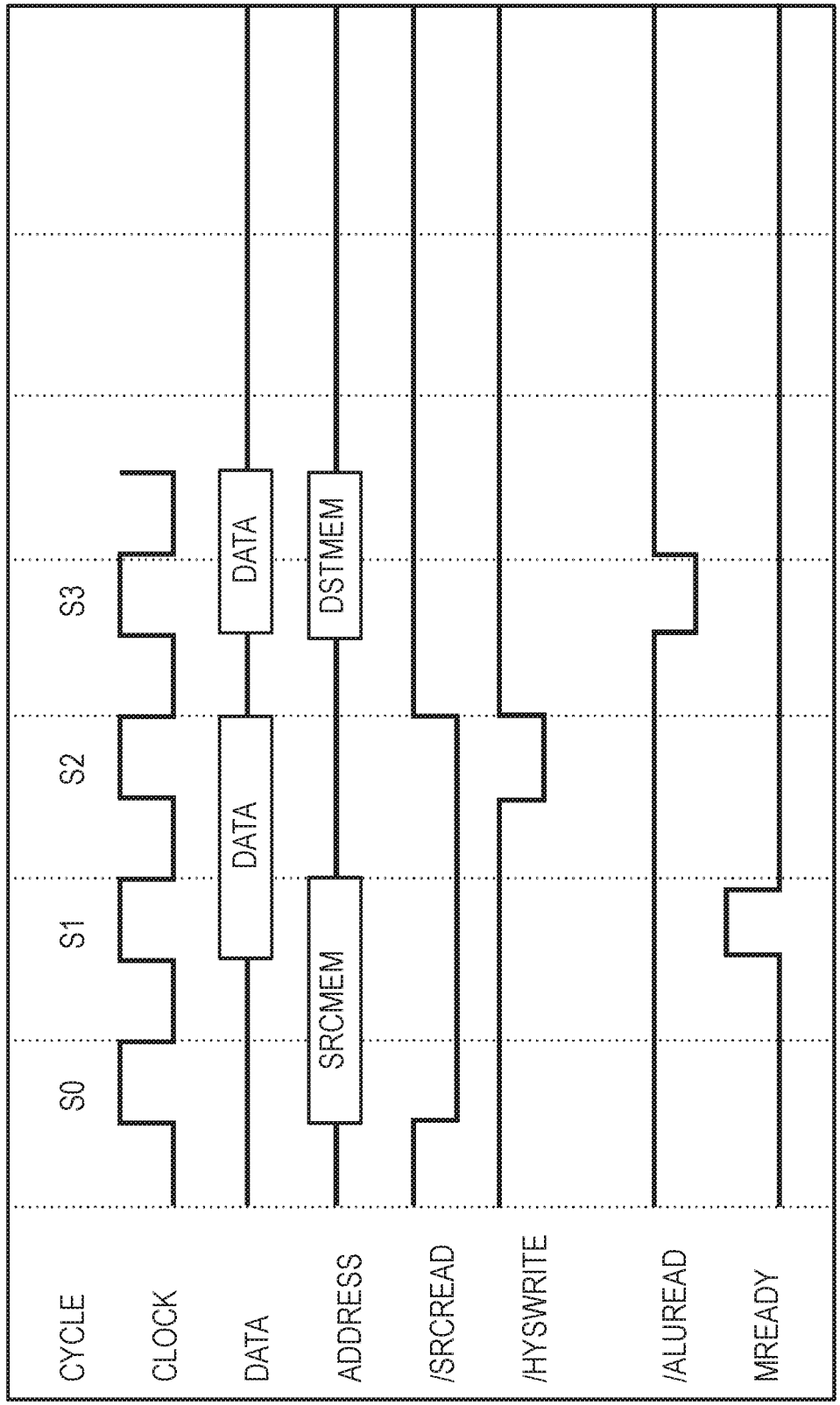
FIG. 12 is a timing diagram of a DMA Memory-Transfer Bus Cycle in an example embodiment.

FIGS. 11 and 12 are timing diagrams illustrating operation of a legacy bus (FIG. 11) and, in contrast, operation of a DMA device in an example embodiment. As shown, the source address latches data onto the data bus by activating the SRCREAD and awaiting an indication that the memory is ready (MREADY) before strobing the destination write (DSTWRITE).

The state sequencer for the legacy bus timing may be as follows:

| state | symbol | name |
|---|---|---|
| 0 | 0000 | DMA Request SRCMEM,DSTMEM,COUNT |
| 1 | 0001 | Bus Hold Request Assert |
| 2 | 0011 | Processor Hold Request Acknowledge |
| 3 | 0010 | TERMINAL COUNT=COUNT |
| 4 | 0110 | SRCMEM ON ADDRESS BUS/SRCREAD ACTIVE |
| 5 | 0111 | MEMREADY? NO: GOTO STATE 5 |
| 6 | 0101 | DSTMEM ON ADDRESS BUS/DSTMEMWRITE ACTIVE |
| 7 | 0100 | DSTMEMWRITE INACTIVE/SRCREAD INACTIVE |
| 8 | 1100 | INCREMENT SRCMEM/INCREMENT DSTMEM/DECREMENT TERMINAL COUNT |
| 9 | 1101 | TERMINALCOUNT=0? NO: GOTO STATE 4 |
| 10 | 1111 | HOLD REQUEST DE-ASSERTED/INIERRUPT CPU TRANSFER COMPLETE |

Figure 13:
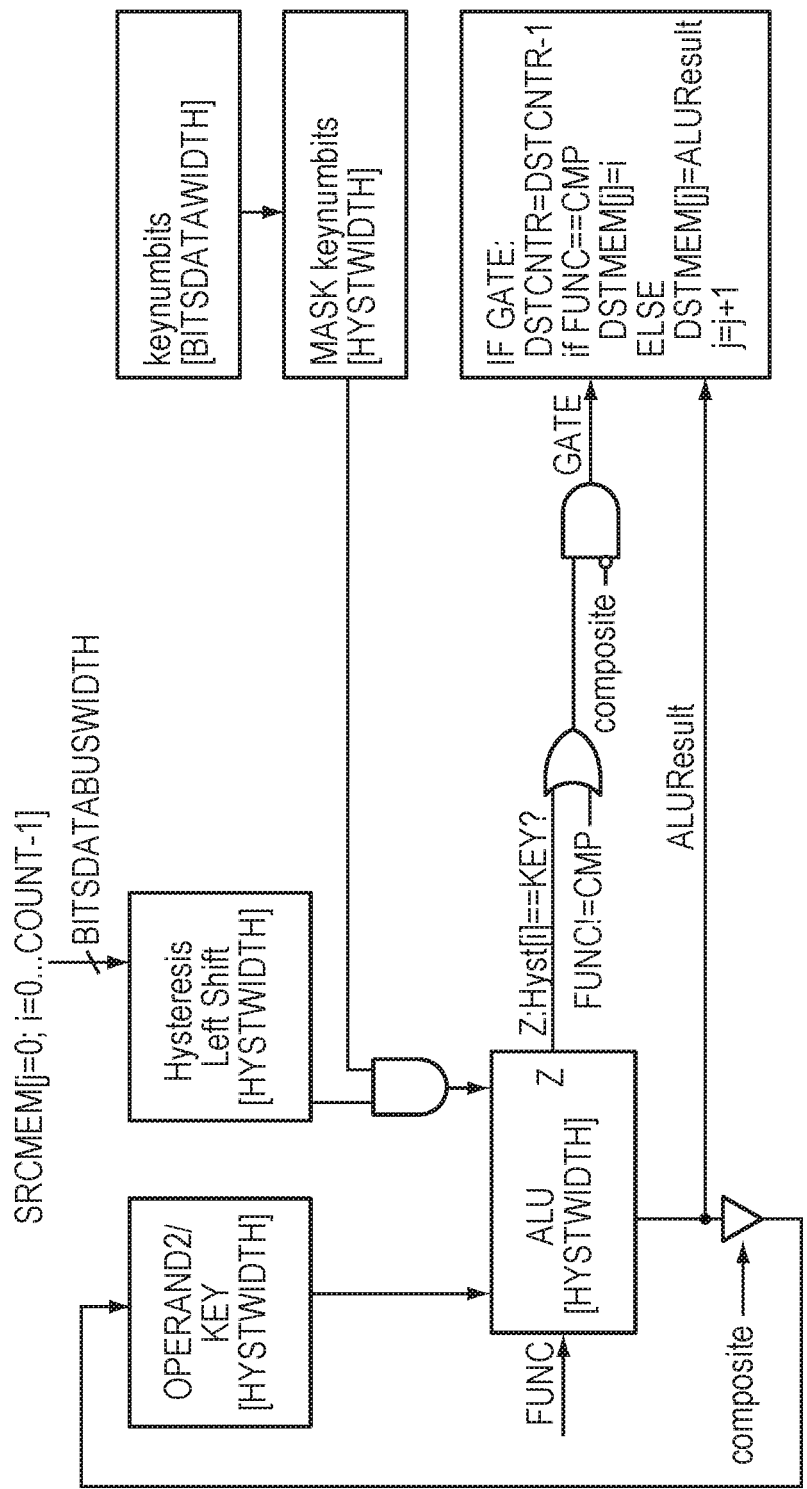
FIG. 13 is a diagram of a portion of a DMA device in one embodiment.

FIG. 13 depicts a number of components of a DMA device in an example embodiment. The components may be included in a circuit such as the operational circuit 310 described above. If the FUNC is a NO-OP (ie, ADD 0), it can be used to load the key OPERAND2 thereby, during the initial configuration, loading to "KEY" can be effected.

During data-transformation, instead of data simply being transferred, it is shifted through a Hysteresis buffer and either a comparison or mathematical/logical transform is performed. The components shown in FIG. 13 are described in further detail below with reference to FIGS. 14-18.

Figure 14:
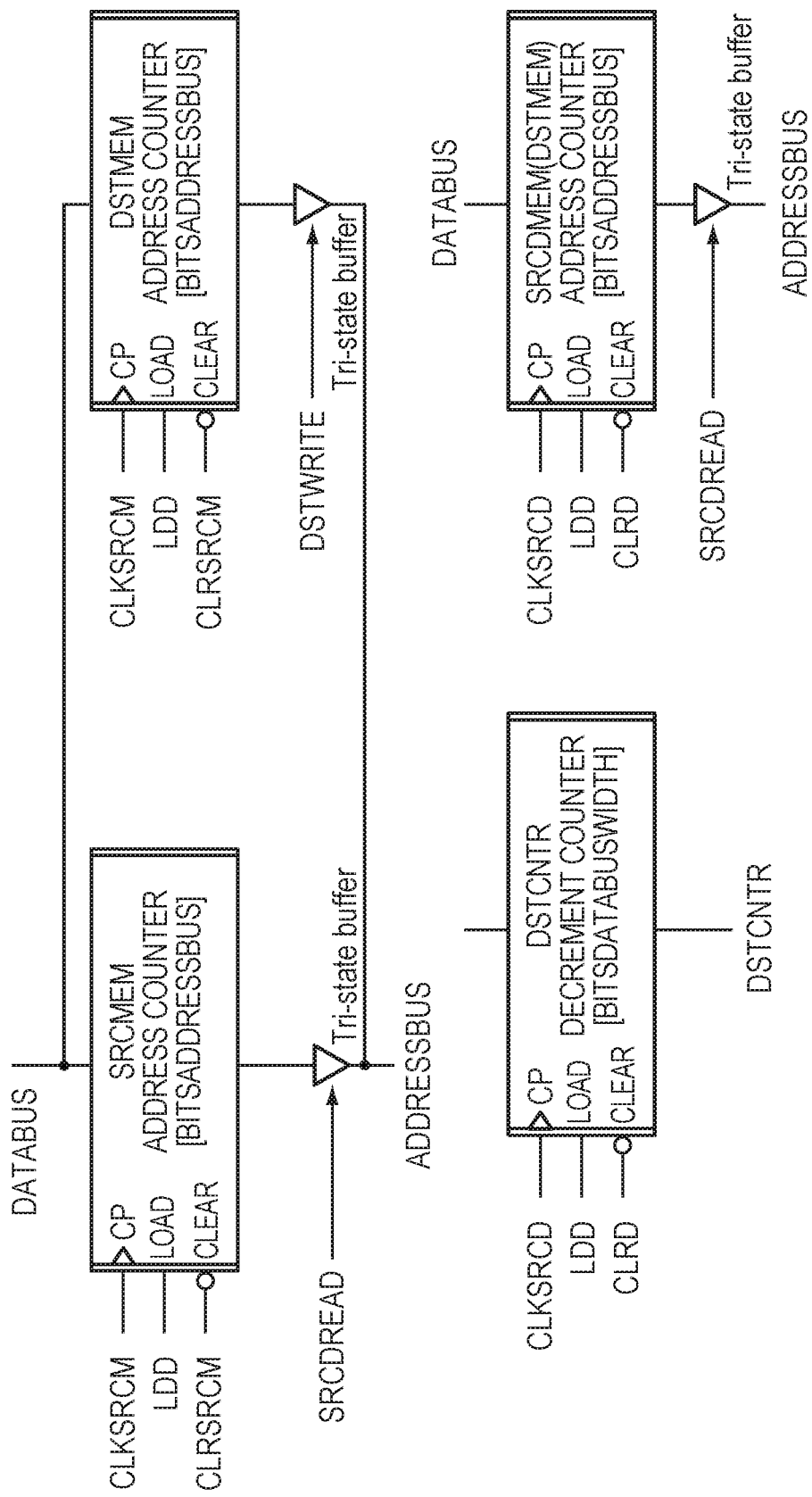
FIG. 14 is a block diagram of registers and counters of a DMA device in one embodiment.

FIG. 14 illustrates registers to accommodate key loading and transfer counting. Here, a separate address counter "SRCDMEM" is used for the special case of loading the key. Likewise, the DSTCNTR is introduced for determining if all possible DSTMEM space addresses have been used. It is decremented for all transforms in the non-composite case. When the sub-mode is Compare (CMP), it determines whether all entries were a match or not.

Figure 15:
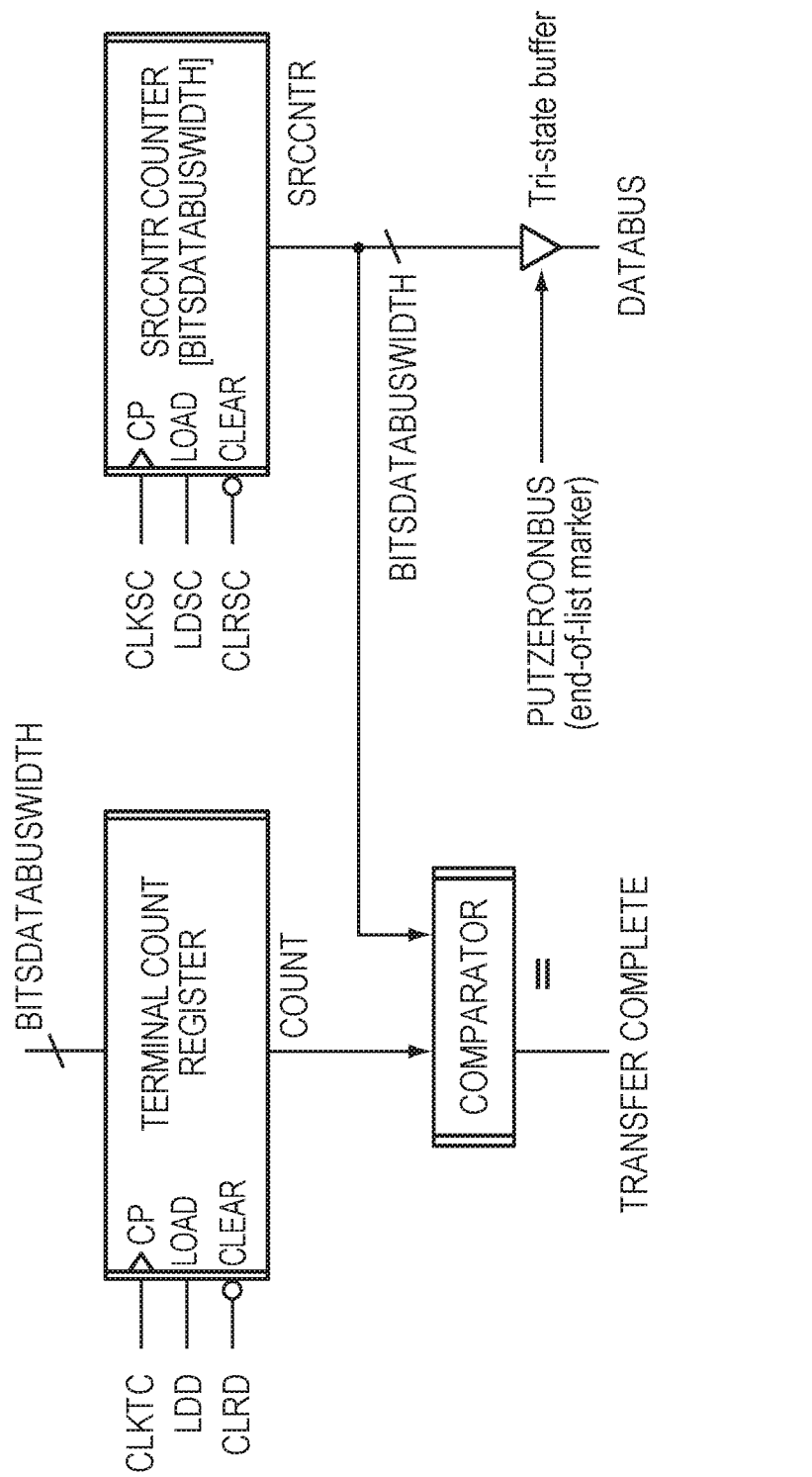
FIG. 15 is a block diagram of counters of a DMA device in one embodiment.

FIG. 15 shows the newly separated SRCCNTR. In the case of Transfer Modes FUNC=CMP, the output of the SRCCNTR is used to record the offset for which a "match" is found in the SRCMEM address space.

Figure 16:
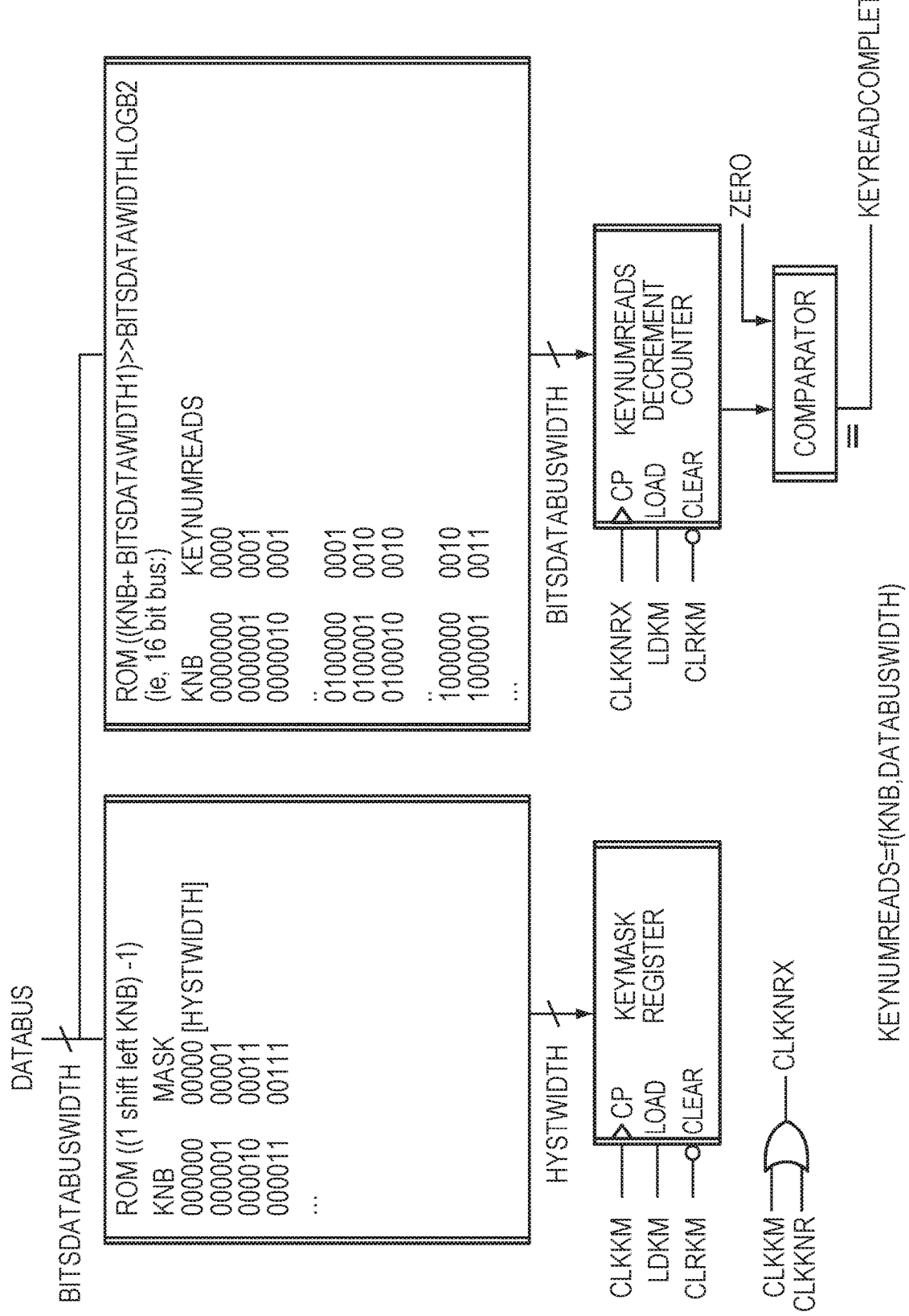
FIG. 16 is a block diagram illustrating a process of determining a key mask in an example embodiment.

FIG. 16 depicts a method for determining the KEYMASK and number-of-reads required to obtain the KEY (OPERAND2) combinatorially, using a ROM, without doing otherwise complicating math. OPERAND2 is then a series of SRCMEM datums serially shifted value into the HYSTERESIS buffer before storing into the KEY register.

The Compare use case may benefit from 'wildcards' which can be accomplished by configuring a mask that has zeroes embedded within it. For this, the mask would be specified in the same way as OPERAND2/KEY and introduced along with the configuration operations.

A "wildcarded" mask would be facilitated by a masking of the key and Hysteresis data before being introduced to the ALU.

The circuit of FIG. 16 is also used for determining the number of writes necessary to transfer the composite result to Destination Memory. For example, a summation (ADD/composite) of 1024 word entries, each of value 65535 would otherwise overflow a memory address space of simple words whose maximum value, each is 65535. In this case, should a mask of 32 bits be supplied, the result will be written as two destination memory writes where a 16 bit databus is in use in much the same manner as the read of OPERAND2.

A composite MULTIPLY of all entries of 1024-word entries in a page provides a limitation of this approach. It would be specified as a noncontinuing, composite transform with MULTIPLY as the ALU FUNC, and with OPERAND2 equal 1. This would require multiplying all entries (II) each of which potentially have the value 65535 (~$2^{16}$) for a worst case result of approximately ($2^{16}$)^1024 which would require a HYSTERESIS buffer size of ~262,144 bits and a MASK of the same size. Since the destination page offers only 1024*16 bits (16,384 in this example), the result would have to be written across 16 destination pages. This exemplifies a limitation of the device, eg for MULTIPLY, although the programmer may only be interested in the results least significant bits of the result.

In FIG. 16, the number of DATABUS references to attain OPERAND2/KEY as a function of the HYSTBUFFWIDTH is determined such that for KEYNUMBIT bit lengths 1 . . . DATABUSWIDTH, only one reference be made, for bit lengths DATABUSWIDTH+1 . . . 2*DATABUSWIDTH, two references may be made, etc.

Figure 17:
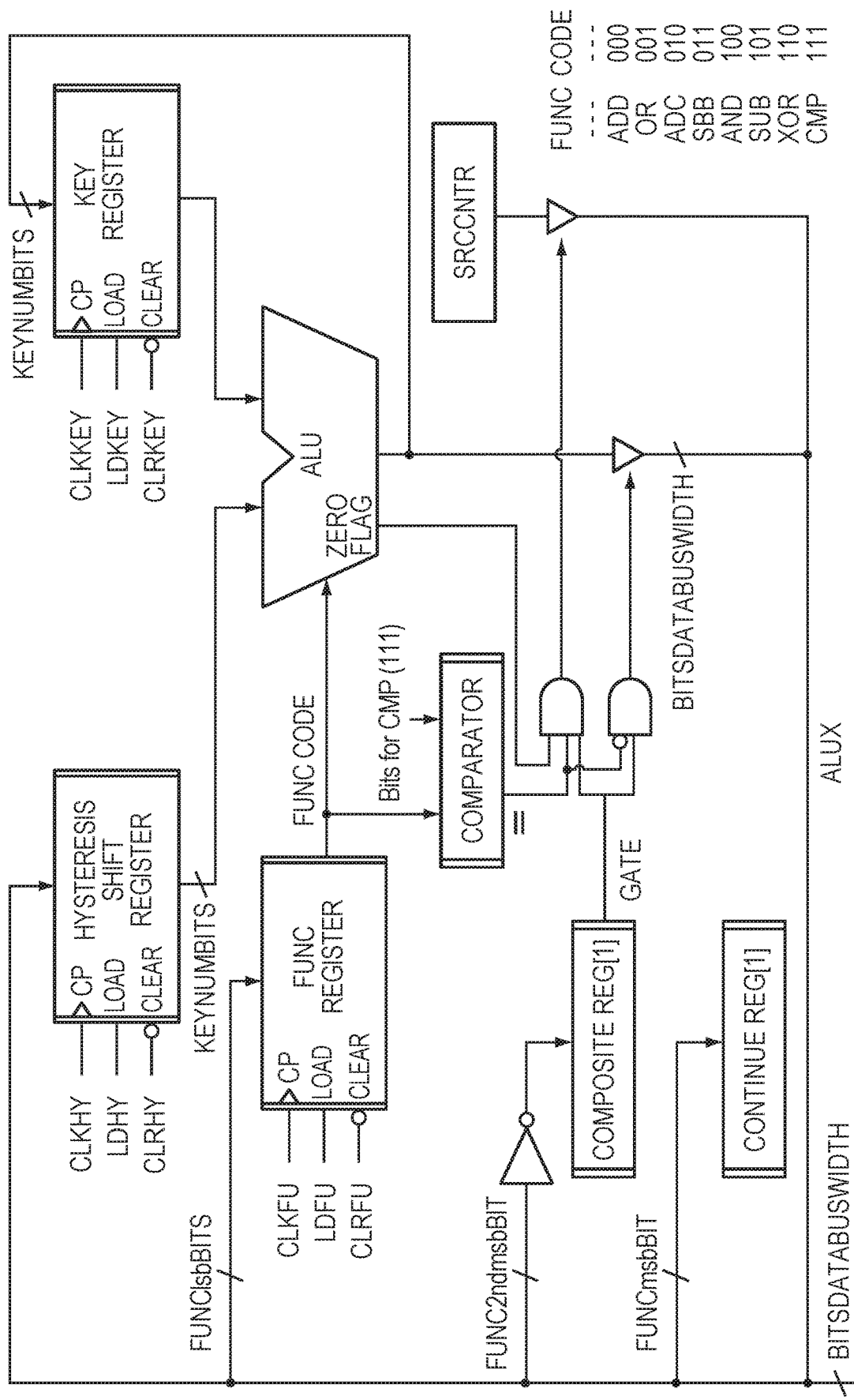
FIG. 17 illustrates circuitry for transforming the datums in source memory space in one embodiment.

FIG. 17 details circuitry for transforming the datums in SRCMEM space considering whether or not the output should be stored (GATE) in an example embodiment. This may be dependent on whether a composite (file signature) is sought or a datum-by-datum (non-composite) result is sought. The composite specification is maintained in a one-bit register as is the "continue" state and the ALU FUNC transform specification.

Figure 18:
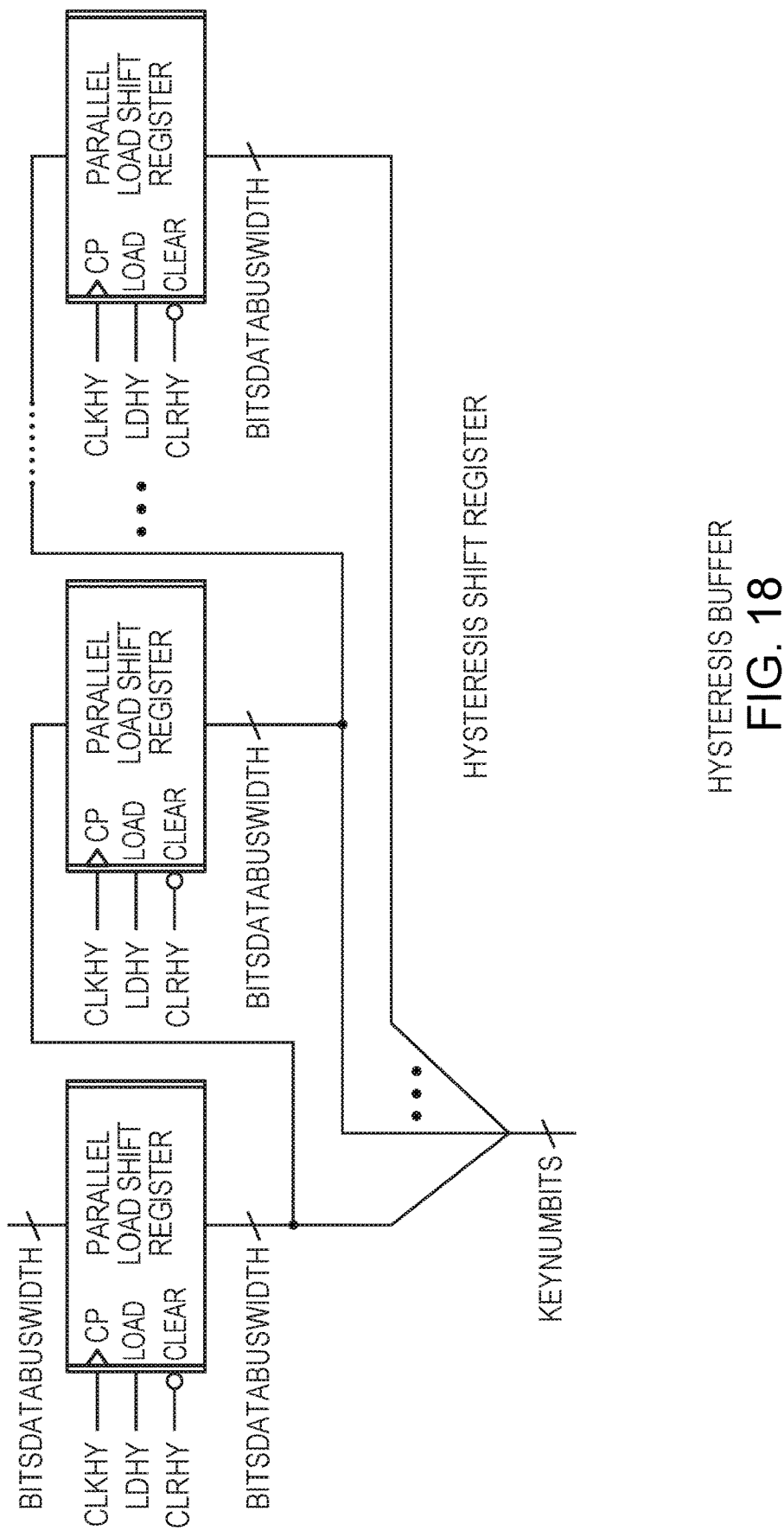
FIG. 18 illustrates a hysteresis buffer in an example embodiment.

FIG. 18 details the HYSTERESIS buffer. DATABUS-WIDTH datum sized shifting is used to retain memory of present and past bytes such that KEYNUMBITS are retained. The maximum KEYNUMBITS supported is a limitation set by VLSI requirements or practical concerns. To the degree practical, this allows a 10 bit datum to be searched even on an 8 bit data bus width and ameliorates problems where the DATABUSWIDTH is less than the referenceable memory datum size.

The state sequencer for the bus timing in an example embodiment may be as follows:

| | | State symbol name: |
|---|---|---|
| 0 | 000000 | DMA Request |
| | | SRCMEM, DSTMEM, COUNT, MODE-TRANSFORM/Continue/Composite |
| | | [LDD-SRCMEM LATCHED INTO "SRCMEM" ADDRESS COUNTER/CLKSRCM] |
| | | [    DSTMEM LATCHED INTO "SRCDMEM" and |
| | |                              "DSTMEM" ADDRESS COUNTERS/CLKDESTM] |
| | | [    COUNT LATCHED INTO "DSTCNTR" and |
| | |                              "TERMINALCOUNT" REGISTERS/CLKSRCD] |
| | | [    CLRSC CLEAR SOURCE COUNTER/CLKSC] |
| 1 | 000001 | Bus Hold Request Assert |
| 2 | 000011 | Processor Hold Request Acknowledge |
| | | . . .Get FUNC. . . |
| 3 | 000010 | SRCDMEM ON ADDRESS BUSS/MEMR ACTIVE |
| | | [SRCDREAD ACTIVE/MEMR ACTIVE] |
| 4 | 000110 | STORE2REGISTER FUNC-Composite-Continuation Datum/MEMR INACTIVE |
| | | [LDFU ACTIVE/CLKFU] |
| | | [FUNC BITS LATCHED INTO FUNC REGISTER] |
| | | [Continue BIT LATCHED INTO "Continue"] |
| | | [Composite BIT LATCHED INTO "Composite"] |
| 5 | 000111 | MEMW ACTIVE |
| | | [OVERWRITE DSTMEM WITH NONZERO: |
| | |    MARK POTENTIAL SEARCH LIST AS "NONEFOUND"] |
| 6 | 000101 | MEMW INACTIVE/INCREMENT SRCDMEM/MEMR ACTIVE |
| | | [CLKSRCD] |
| 7 | 000100 | STORE2REGISTER KEYMASK/TERMINALCOUNT/MEMR INACTIVE |
| | | [LDKM/CLKKM] |
| 8 | 001100 | MEMW ACTIVE |
| 9 | 001101 | SAVEFROMREGISTER(CONTAINING ZERO) SRCCNTR/MEMW INACTIVE |
| | | [PUTZEROONBUS] |
| 10 | 001111 | CONTINUE? NO: GOTO STATE . .Transform |
| | | . . .Load Key. . . . |
| 11 | 001110 | RESET HYSTERESIS |
| 12 | 001010 | INCREMENT SRCDMEM/MEMR ACTIVE |
| | | [CLRHY/CLKHY] |
| | | [CLKSRCD] |
| 13 | 001011 | HYSTERESIS= (LEFT SHIFT Datum into HY BITSDATAWIDTH) AND KEYMASK |
| | | [CLKHY] |
| 14 | 001001 | DECREMENT KEYNUMREADS/INCREMENT SRCDMEM |
| | | [CLKKNR] |
| 15 | 001000 | KEYNUMREADS=0? NO:   GOTO STATE 12 |
| | | [KEYREADSCOMPLETE] |
| 16 | 011000 | KEY = HYSTERESIS |
| | | [LDKEY/CLKKEY] |
| 17 | 011001 | RESET HYSTERESIS/INCSYSTEMSTATE |
| | | [CLRHY/CLKHY] |
| | | . . .Transform. . . . |
| 18 | 011011 | SRCMEM ON ADDRESS BUSS |
| | | [SRCREAD] |
| 19 | 011010 | MEMREADY? NO: GOTO STATE this |
| 20 | 011110 | HYSWRITE ACTIVE |
| | | [LDHY/CLKHY] |
| 21 | 011111 | HYSWRITE INACTIVE/SRCREAD INACTIVE |
| | | [~LDHY] |
| | | [~SRCREAD] |
| 22 | 011101 | INCREMENT SRCMEM/INCREMENT SRCCOUNT |
| | | [CLKSRCMEM] |
| 23 | 011100 | GATE? NO: GOTO . .Transform |
| 24 | 010100 | ALUREAD ACTIVE/DSTMEM ON ADDRESS BUSS/DSTMEMWRITE ACTIVE |
| 25 | 010101 | DSTMEMWRITE INACTIVE/ALUREAD INACTIVE |
| 26 | 010111 | INCREMENT DSTMEM/DECREMENT DSTCNTR |
| 27 | 010110 | SRCCNT==COUNT? NO: GOTO . .Transform |
| 28 | 010010 | composite or (DSTCNTR<>0)? NO: GOTO STATE 31 |
| 29 | 010011 | ALUREAD ACTIVE/DSTMEM ON ADDRESS BUSS/DSTMEMWRITE ACTIVE |
| 30 | 010001 | DSTMEMWRITE INACTIVE/ALUREAD INACTIVE |
| 31 | 010000 | HOLD REQUEST DE-ASSERTED/INTERRUPT CPU TRANSFER COMPLETE |

While example embodiments have been particularly shown and described, it will be understood by those skilled in the art that various changes in form and details may be made therein without departing from the scope of the embodiments encompassed by the appended claims.

What is claimed is:

1. A direct memory access (DMA) device, comprising:
a circuit configurable to perform operations as a function of configuration information, the circuit including a buffer; and
a sequencer configurable to:
(i) cause the buffer to read the configuration information from a destination memory address space to configure the circuit to perform a given operation, the destination memory address space being an address space at which results of the given operation are to be written;
(ii) cause the buffer to read source data from a source address space, the circuit configured to perform the given operation on the source data; and
(iii) cause the buffer to write the results of the given operation to the destination memory address space.

2. The device of claim 1, further comprising an operation operand register that is initialized with an operand from the configuration information.

3. The device of claim 2, wherein the operation operand register size is specified by a number of bits from the configuration information.

4. The device of claim 2, further including 1) a hysteresis buffer with a dimension of equal length as the operation operand register and 2) a shift register to enable the circuit to perform the given operation on the source data as a function of the operand.

5. The device of claim 2, further comprising a comparator configured to selectively permit a write to destination memory.

6. The device of claim 2, further comprising an operand number bits register and a mask register with a dimension of equal length as the operation operand register.

7. The device of claim 1, further comprising an operation function register that is initialized with a function specific to an arithmetic logic unit (ALU) implemented with the device.

8. The device of claim 7, wherein the operation function register is initialized to indicate whether a search operation includes a compare operation to be performed by the ALU.

9. The device of claim 8, wherein, in response to the operation function register indicating a compare operation, the sequencer is further configured to generate a search-key indice.

10. The device of claim 8, wherein, in response to the operation function register indicating a compare operation, the circuitry is further configured to load a general mask indicated by a number of bits from the configuration information.

11. The device of claim 1, further comprising a continuation register that is initialized to specify whether a transfer is to retain state information from a previous transfer or transform operation.

12. The device of claim 1, further comprising a composite register that is initialized to specify whether a transform is to be a composite transform operation or a one-for-one transform operation.

13. A computer system, comprising:
a CPU; and
a direct memory access (DMA) device;
the CPU configured to write DMA configuration data into destination memory address space, the destination memory address space being an address space at which results of a given operation are to be written, and to cause the DMA device to change operating modes from a first mode to a second mode, the second mode causing the DMA device to read the DMA configuration data from the destination memory address space to configure the DMA device to transform source data from source memory address space and write transformed data to the destination memory address space.

14. The system of claim 13, wherein, in the first mode, the DMA device is configured to transfer the source data to the destination memory.

15. The system of claim 13, wherein the DMA device further comprises an operation operand register that is initialized with an operand from the configuration information.

16. The system of claim 15, wherein the operation operand register size is specified by a number of bits from the configuration information.

17. The system of claim 15, wherein the DMA device further includes 1) a hysteresis buffer with a dimension of equal length as the operation operand register and 2) a shift register to enable the circuit to transform the source data as a function of the operand.

18. The system of claim 13, wherein the DMA device further includes a comparator configured to selectively permit a write to destination memory.

19. The system of claim 15, wherein the DMA device further includes an operand number bits register and a mask register with a dimension of equal length as the operation operand register.

20. The system of claim 13, wherein the DMA device further includes an operation function register that is initialized with a function specific to an arithmetic logic unit (ALU) implemented with the device.

21. The system of claim 20, wherein the operation function register is initialized to indicate whether a search operation includes a compare operation to be performed by the ALU.

* * * * *